(12) United States Patent
Naoi

(10) Patent No.: US 7,171,535 B2
(45) Date of Patent: Jan. 30, 2007

(54) SERIAL OPERATION PIPELINE, ARITHMETIC DEVICE, ARITHMETIC-LOGIC CIRCUIT AND OPERATION METHOD USING THE SERIAL OPERATION PIPELINE

(75) Inventor: Junichi Naoi, Tokyo (JP)

(73) Assignee: Sony Computer Entertainment Inc. (JP)

( * ) Notice: Subject to any disclaimer, the term of this patent is extended or adjusted under 35 U.S.C. 154(b) by 634 days.

(21) Appl. No.: 10/404,182

(22) Filed: Apr. 1, 2003

(65) Prior Publication Data

US 2003/0200237 A1    Oct. 23, 2003

(30) Foreign Application Priority Data

Apr. 1, 2002   (JP)   ............................. 2002-099202

(51) Int. Cl.
  *G06F 13/00*   (2006.01)
(52) U.S. Cl. ....................... 711/169; 711/140; 711/158; 708/233
(58) Field of Classification Search ................ 711/169, 711/140, 158; 708/233
See application file for complete search history.

(56) References Cited

U.S. PATENT DOCUMENTS 5,163,018 A * 11/1992 Ikegaya et al. ............. 708/421
5,532,938 A *  7/1996 Kondo et al. ............... 708/524

* cited by examiner

*Primary Examiner*—Stephen C. Elmore
*Assistant Examiner*—Daniel Kim
(74) *Attorney, Agent, or Firm*—Lerner,David,Littenberg, Krumholz & Mentlik, LLP

(57) ABSTRACT

A general-purpose serial operation pipeline realizes a complicated processing flow with an extemporaneous and explosive amount of operations with respect to various data sizes. A plurality of arithmetic-logic circuits (SALCs) that are controlled individually, and that can be operated together with another arithmetic-logic circuit (SALC) are connected in a cascade manner to form a serial operation pipeline. At least one of the plural SALCs includes a line for outputting data from an upstream SALC to a downstream SALC, a line for feeding back reverse data from the downstream SALC to the upstream SALC, and latch circuits for latching the data on the respective lines, thereby being capable of feeding back data from an arbitrary SALC to another SALC.

15 Claims, 31 Drawing Sheets

CYCLE 12

CYCLE 13

CYCLE 14

CYCLE 15

FIG. 8A b'1010 × b'1100 + b'0001011101 = b'11000101
A         B         C                OUTPUT

FIG. 8B

▨ A data  ▩ B data  ▦ C data
░ intermediate data  ▤ OUTPUT data

ACQUIRE MSB FOUR TIMES WHEN ACQUIRING DATA

FIG. 8C

| SET | data set {co:Data, s:Ref, car:0} |
| ADS | add & shift {if(co=0) shift only} |
| THR | through | multiplier (add & shift) — set data

SERIAL OPERATION PIPELINE, ARITHMETIC DEVICE, ARITHMETIC-LOGIC CIRCUIT AND OPERATION METHOD USING THE SERIAL OPERATION PIPELINE

CROSS REFERENCE TO RELATED APPLICATION

The present application claims priority from Japanese Application No. 2002-99202 filed Apr. 1, 2002, the disclosure of which is hereby incorporated by reference herein.

BACKGROUND OF THE INVENTION

The present invention relates to a serial operation pipeline suitable for an application requiring a discrete operation in which the amount to be operated on expands extemporaneously and explosively, for example, an application for expressing a frequently moving object by computer graphics, and structural elements thereof.

The serial operation pipeline sequentially conducts different operations, such as a command retrieve operation, a command decode operation or a command execute operation, at the same time, thereby increasing processing speed.

The pipeline comprises computing units that deal with a small number of command groups, and the units are connected to each other in a cascade fashion. The combination of the plural computing units to be used is appropriately changed so as to realize various processing, such as addition, subtraction and multiplication, a floating-point operation, comparison, Boolean algebra, or select (IF statement).

In making computer graphics, many kinds of discrete operations are normally conducted, such as operations within a two-dimensional pixel or between pixels, collision detection, object creation or composition, or geometry operation. In such an application, when only the main CPU of a computer is employed, a large amount of computing power is required which cannot be obtained by a computer having a single CPU. For example, a rendering process capacity of the order of several hundreds [Mpolygon/sec] and several tens [Gpixel/sec] is frequently required.

For that reason, a special-purpose processor into which an operation pipeline is installed has been employed up to now.

Most of the conventional processors of this type are made up of a single device, and a plurality of operation pipelines are installed in parallel into the processor in accordance with an estimated amount of operation. A given function is fixedly allocated to each of individual computing units that form the operation pipelines, referred to as so-called "one computing unit with one function". A pipeline using one computing unit with one function is very suitable for, for example, an application that processes the data size of a fixed length by a short throughput.

However, it is difficult to apply one computing unit with one function for various purposes. For example, in the case where the pipeline structure is changed in accordance with the intended purpose, it is necessary to additionally provide a selector (bus) for connecting a path of data to be subjected to an operation and an allocated function. For that reason, the computing units or the operation pipelines are restrictively disposed in parallel within a single device. Also, when at least a regular number of the computing units or the operation pipelines are disposed in parallel, they are prevented from being clustered, and a control and a data path (cash or bus) are required for preventing the cluster, respectively, thereby leading to the deterioration of the integration efficiency.

In order to cope with a variety of applications, it is proposed to structure a programmable data flow graph (DFG). However, the programmable DFG is relatively high in the occupied ratio of non-operation elements, such as the selector, with respect to the computing unit. It has been well known that the ratio becomes higher as the programmability of the operation becomes more enhanced. Also, it is difficult to always execute all the functions of the programmable DFG because the functions are divided into sub-functions. In order to enhance the execution efficiency, the functions must be brought into function blocks, the object of which are fixed to some degree, and become improper for applications that process various types of data.

On the other hand, it is proposed to arrange the computing units in parallel two-dimensionally from the viewpoint of ensuring higher operation capacity. Two-dimensional parallel means that the computing units are arranged in parallel and in a cascade fashion. That is, data flows are arranged in parallel due to deep pipelines. As a special implement, there are rendering pipelines that are disposed in parallel. In making the two-dimensional parallel, only necessary functions are supplied within the pipelines, and the programmability is removed as much as possible, thereby enhancing the efficiency by the cascade connection of the exclusive computing units.

In the future, the need for diversification of discrete operations is expected to grow. In such case, there is desired a general-purpose pipeline that realizes a complicated processing flow with an extemporaneous and explosive amount of operations with respect to various data sizes. In order to structure the general-purpose operation pipelines, it is required that the data path be simple (linear), and that cascade connections be made without uselessness. Also, a construction that can realize various operations by one computing unit is required.

SUMMARY OF THE INVENTION

The present invention has been made under the above circumstances, and therefore an object of the present invention is to realize various operations by one computing unit without increasing the costs.

In order to achieve the above object, according to one aspect of the present invention, there is provided a serial operation pipeline including a plurality of arithmetic-logic circuits connected in a cascade fashion, each of the arithmetic-logic circuits capable of being controlled independently and being operable together with other of the arithmetic-logic circuits. In the serial operation pipeline, at least one of the plurality of arithmetic-logic circuits includes a first line for outputting data from an upstream stage to a downstream stage, a second line for feeding back reverse data from the downstream stage to the upstream stage, and a latch circuit that latches the data on the first and second lines.

In a preferred embodiment of the arithmetic-logic circuit, the first line includes a forward line for outputting to the downstream stage the data received from the upstream stage or an operation result based on the data received from the upstream stage, and the second line includes a backward line for outputting to the upstream stage the reverse data received from the downstream stage or an operation result based on the reverse data received from the downstream stage.

Each of the plural arithmetic-logic circuits includes a decoder for executing a process including an operation corresponding to contents of an externally supplied instruction to produce an execution result, and for outputting the execution result toward a selected one of the first and second lines.

Also, the latch circuit includes a first data latch circuit that latches first output data which is output to the downstream stage, a second data latch circuit that latches second output data which is output to the downstream stage, a carry latch circuit that latches a carry resulting from an operation executed by the decoder for the operation of a succeeding figure, and a shift latch circuit that delays one of the first output data and the second output data for a given period of time.

The latch circuit may further include a reverse latch circuit that latches the reverse data fed back from the downstream stage to the upstream stage, and a control latch circuit that latches control data for controlling an operation of the data latched in the first and second data latch circuits and the reverse latch circuit.

From the viewpoints of reducing a circuit area and increasing the processing speed of the entire pipeline, the data which is processed by the decoder is set to data of a unit processing size, for example, data of the shortest bit length or the equivalent bit length which can be processed by one clock cycle that determines the operation timing of the plural arithmetic-logic circuits.

According to another aspect of the present invention, there is provided an arithmetic device including a switchable connector operable to switchingly connect data input/output lines of plural systems, a plurality of serial operation pipelines connected in parallel with the switchable connector, and an instruction receive mechanism operable to receive externally supplied instructions for the plural serial operation pipelines. In the arithmetic device, each of the plural serial operation pipelines includes a plurality of arithmetic-logic circuits connected in a cascade fashion, each of the arithmetic-logic circuits being operable together with other of the arithmetic-logic circuits, and each of the plural arithmetic-logic circuits includes a forward line for outputting to a downstream stage data received from an upstream stage or an operation result based on the data received from the upstream stage, a backward line for feeding back to the upstream stage reverse data received from the downstream stage or an operation result based on the reverse data received from the downstream stage, a decoder for executing a process corresponding to an externally supplied instruction to produce an execution result and for outputting data representative of the execution result to a selected one of the forward and backward lines, and a latch circuit for synchronizing data output from each of the lines with respect to other of the arithmetic-logic circuits.

The arithmetic device may include a controller, an instruction array including the externally supplied instructions arranged in n rows of m columns and held in the controller, and the controller may serially output each of the m columns of instructions toward a first arithmetic-logic circuit in a serial operation pipeline, and for each of the m columns output, the controller may execute a process which includes allowing execution of an instruction in the column in the first arithmetic-logic circuit, deleting the executed instruction from the column, and outputting the column to a next downstream arithmetic-logic circuit, the controller repeating the process until all of the n rows of instructions are deleted.

It is preferable that an operation procedure for executing an operation through one path is determined in the instruction array.

Also, each latch circuit in the plural arithmetic-logic circuits includes a first data latch circuit that latches first output data output to the downstream stage, a second data latch circuit that latches second output data output to the downstream stage, a reverse latch circuit that latches reverse data output to the upstream stage, a carry latch circuit that latches a carry resulting from an operation executed by the decoder for the operation of a succeeding figure, a shift latch circuit that delays one of the first output data and the second output data for a given period of time, and a control latch circuit that latches control data for controlling an operation of the data latched in the first and second data latch circuits and the reverse latch circuit.

Similarly, from the viewpoint of increasing the processing rate of the entire device, the data on the forward line and the data on the backward line in the respective decoders of the plural arithmetic-logic circuits are set as data of a unit processing size.

In the arithmetic device, the switchable connector, the plurality of serial operation pipelines and the instruction receive mechanism may be installed in one semiconductor device, and a control signal of the switchable connector and the instruction array may be input to the arithmetic device in accordance with the intended purpose, thereby being capable of providing the general purpose property.

According to still another aspect of the present invention, there is provided an operation method using a serial operation pipeline. The operation method includes providing a serial operation pipeline by connecting in a cascade fashion a plurality of arithmetic-logic circuits including at least one first line for outputting data from an upstream stage to a downstream stage, and a second line for feeding back reverse data from the downstream stage to the upstream stage, each of the plurality of arithmetic-logic circuits being capable of independently conducting serial operations and selecting one of the lines to which data representative of an operation result is output; providing an instruction array which reflects a process of simultaneous execution through one path by the plurality of arithmetic-logic circuits, the instruction array including instructions for executing the process arranged in n rows and m columns; serially outputting each of the m columns of instructions to a first arithmetic-logic circuit of the serial operation; for each of the m columns output, executing an instruction in the column in the first arithmetic-logic circuit, deleting the executed instruction from the column, and outputting the column to a next downstream arithmetic-logic circuit; and repeating the process until all of the n rows of instructions are deleted.

BRIEF DESCRIPTION OF THE DRAWINGS

These and other objects and advantages of this invention will become more fully apparent from the following detailed description taken with the accompanying drawings in which:

FIGS. 1A and 1B are diagrams showing a principle of the present invention, in which FIG. 1A shows an example of one 16-bit computing unit, and FIG. 1B is an example of 16 one-bit computing units, respectively;

FIG. 8A is a logic operation expression for explaining the operation example of an arithmetic device in accordance with the present invention, FIG. 8B is an explanatory diagram showing the structure of an input data train, and FIG. 8C is an explanatory diagram showing the structure of an input instruction array;

DETAILED DESCRIPTION

Now, a description will be given in more detail of preferred embodiments of the present invention with reference to the accompanying drawings.

First, a basic principle of the present invention will be described with reference to FIGS. 1A and 1B.

A serial computing unit conducts, for example, a serial operation of about 1 to 3 bits. The throughput of the serial computing unit reduces to 1/(data width) (in case of a one-bit serial operation) as compared with a parallel computing unit that conducts multiple-bit operations of about 16 bits, however, the computing unit area is reduced along with a reduction of the throughput. Therefore, the more the parallel degree of the pipelines increases, the more the throughput reduces. As a result, the manufacture costs are not substantially different between the serial computing unit and the parallel computing unit.

Figure 1A:
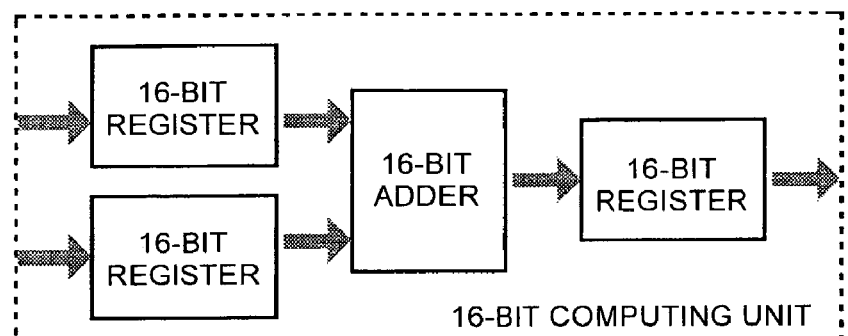
Figure 1B:
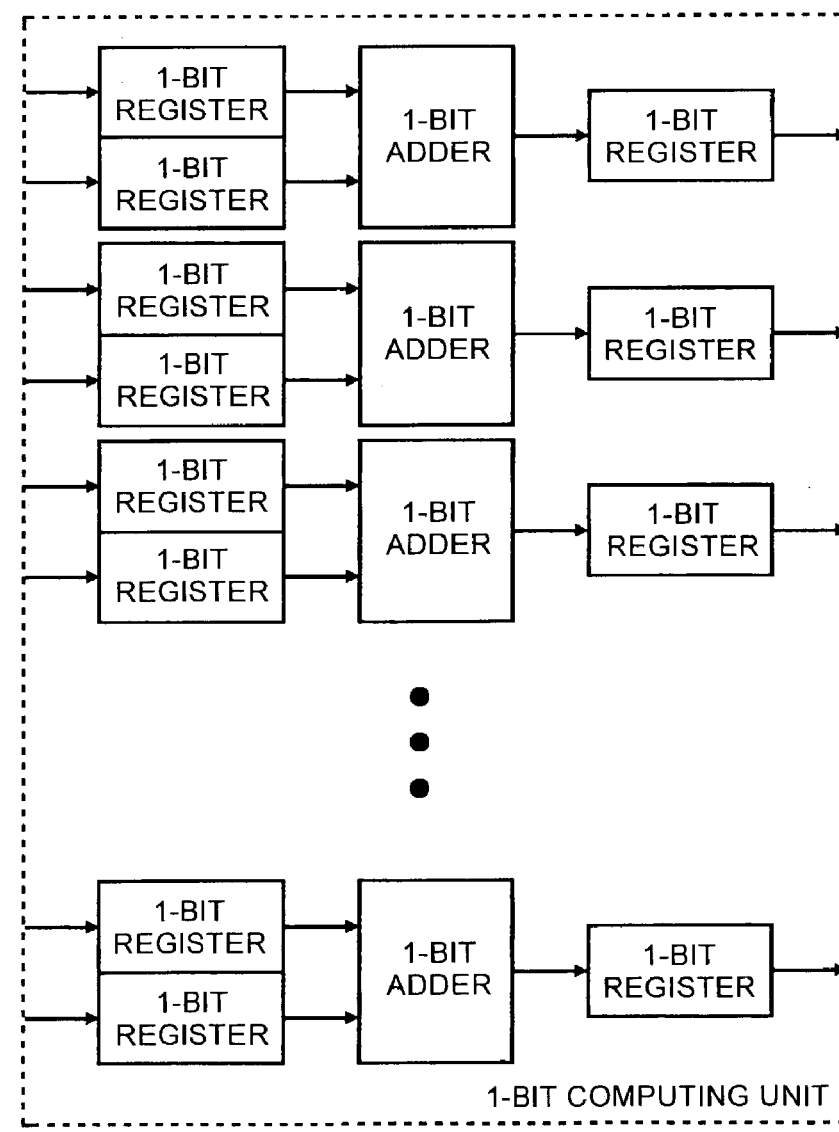

For example, a 16-bit computing unit structured in such a manner that two 16-bit registers are disposed in parallel, their outputs are added by one 16-bit adder, and the addition result is stored in one 16-bit register, as shown in FIG. 1A, is substantially identical in cost with 32 1-bit registers. The 32 1-bit registers are disposed in parallel, and 16 1-bit adders are disposed for adding the outputs of respective pairs of 1-bit registers together, and 16 1-bit registers are disposed for storing the outputs of the respective adders, as shown in FIG. 1B. The latter is advantageous in that the processing rate can be increased to the extent that the respective stages of the pipes are shortened.

This embodiment is exemplified by an example in which the execution environments of various multi-bit operation commands are realized by the combination of feedback function installed serial arithmetic-logic circuits (Serial-ALCell, hereinafter referred to as "SALC") of a unit processing size on the basis of the above-mentioned principle. The unit processing size means the shortest bit length that can be processed by one clock in the SALC, which is 1 bit in the simplest example, but normally about 1 to 3 bits as described above.

SALC

Figure 2:
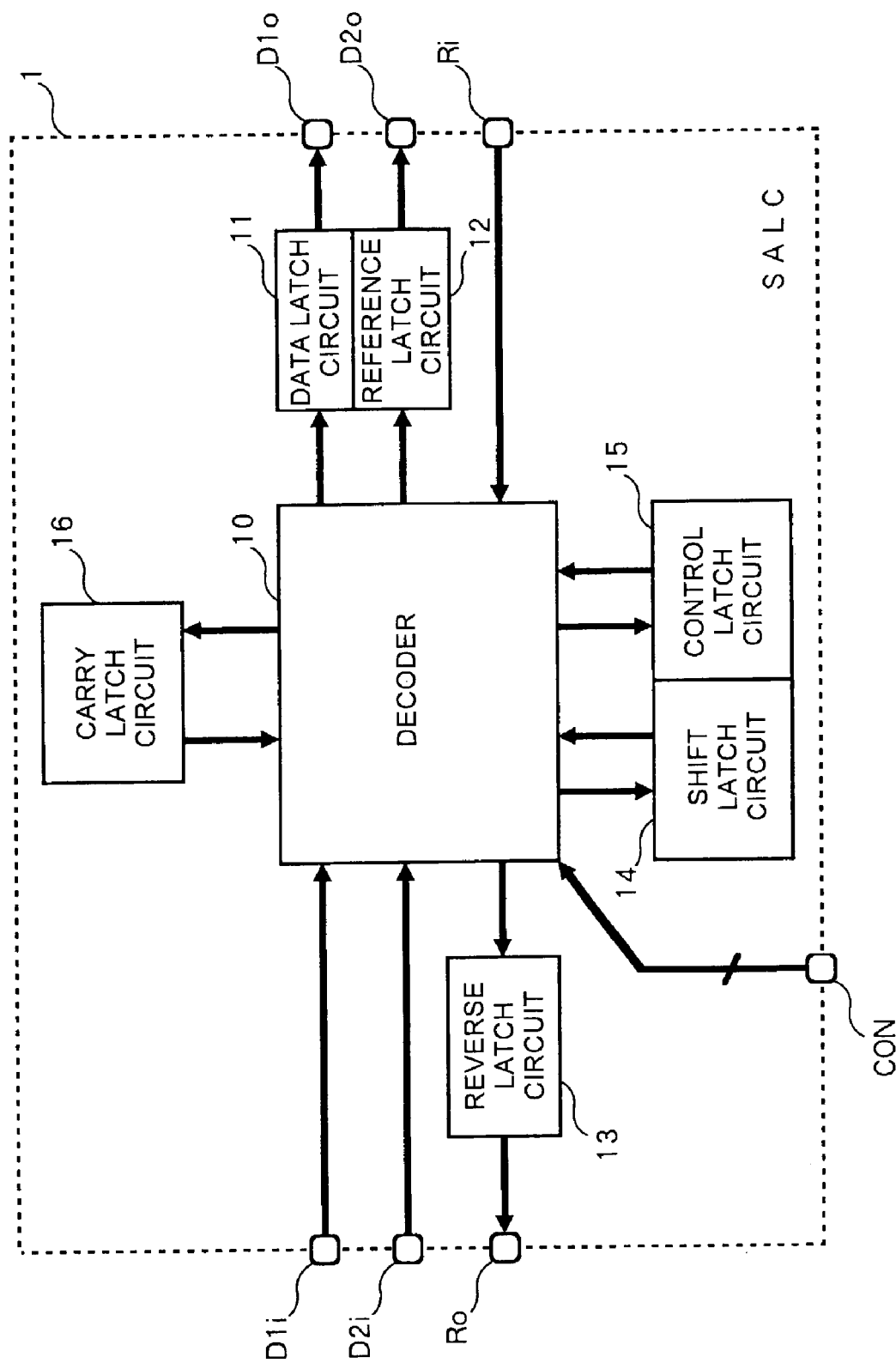
FIG. 2 is a structural diagram showing an arithmetic-logic circuit (SALC) in accordance with an embodiment of the present invention.

A structural example of the SALC is shown in FIG. 2. As is apparent from FIG. 2, a SALC 1 according to this embodiment includes data input terminals D1$i$ and D2$i$ of two systems, data output terminals D1$o$ and D2$o$ of two systems, and a reverse data input terminal Ri and a reverse data output terminal Ro of one system. The SALC 1 is formed with a forward line for outputting data of the two systems from an upstream stage (the left side in the figure) to a downstream stage (the right side in the figure), and a backward line for feeding back the data from the downstream stage to the upstream stage.

In the following description, it is assumed that data on a line which is output from the data output terminal D1o is "output data", data on a line which is output from the data output terminal D2o is "reference data", and data on a line which is output (fed back) from the reverse data output terminal Ro is "reverse data".

In the SALC 1, in order to be synchronized with another SALC that is part of the serial operation pipeline which will be described later, the output data is latched in a data latch circuit 11, the reference data is latched in a reference latch circuit 12, and the reverse data is latched in a reverse latch circuit 13.

The SALC 1 includes a decoder 10 that decodes the contents of an instruction which is input from an instruction input terminal CON, executes a process corresponding to the decoded result, and selects a line that outputs the execution result. As a processing example, there is arithmetic processing such as addition, subtraction, multiplication and division operations or a logic operation, as well as control processing such as a path control, a latch control or a command with a condition. The decoder 10 also selects a forward line that directs the data received from the upstream stage toward the downstream stage, and a backward line that directs the data received from the downstream stage toward the upstream stage. The decoder 10 can execute a macro command in cooperation with the decoders of plural other SALCs 1.

The decoder 10 is connected with various latch circuits for facilitating the above-mentioned operations or the like, that is, a shift latch circuit 14, a control latch circuit 15 and a carry latch circuit 16.

The shift latch circuit 14 operates so as to latch the reference data and to output the latched reference data by a succeeding figure, for example, when conducting the operation, in order to delay the line of the reference data by a given period of time as compared with the line of the output data. The carry latch circuit 16 latches a carry of the operation result until the operation of the succeeding figure is conducted. The control latch circuit 15 latches control data that controls the output timing of the output data, the reference data and the reverse data until an output command is output from the decoder 10.

In the SALC 1 constructed as described above, because the forward line and the backward line can be replaced with each other by the decoder 10, in the case where a plurality of SALCs 1 are connected in a cascade fashion to form the serial operation pipeline, the forward line and the backward line are appropriately selected so as to conduct logic operations by a flexible data range.

Also, a multiplier, a divider, a sum-of-products computing unit, a float computing unit (an index and a mantissa are calculated separately, and those results are reflected by each other), and so on can be readily constructed.

SALP

An embodiment of a serial operation pipeline using the above-mentioned SALC 1 will now be described.

Figure 3:
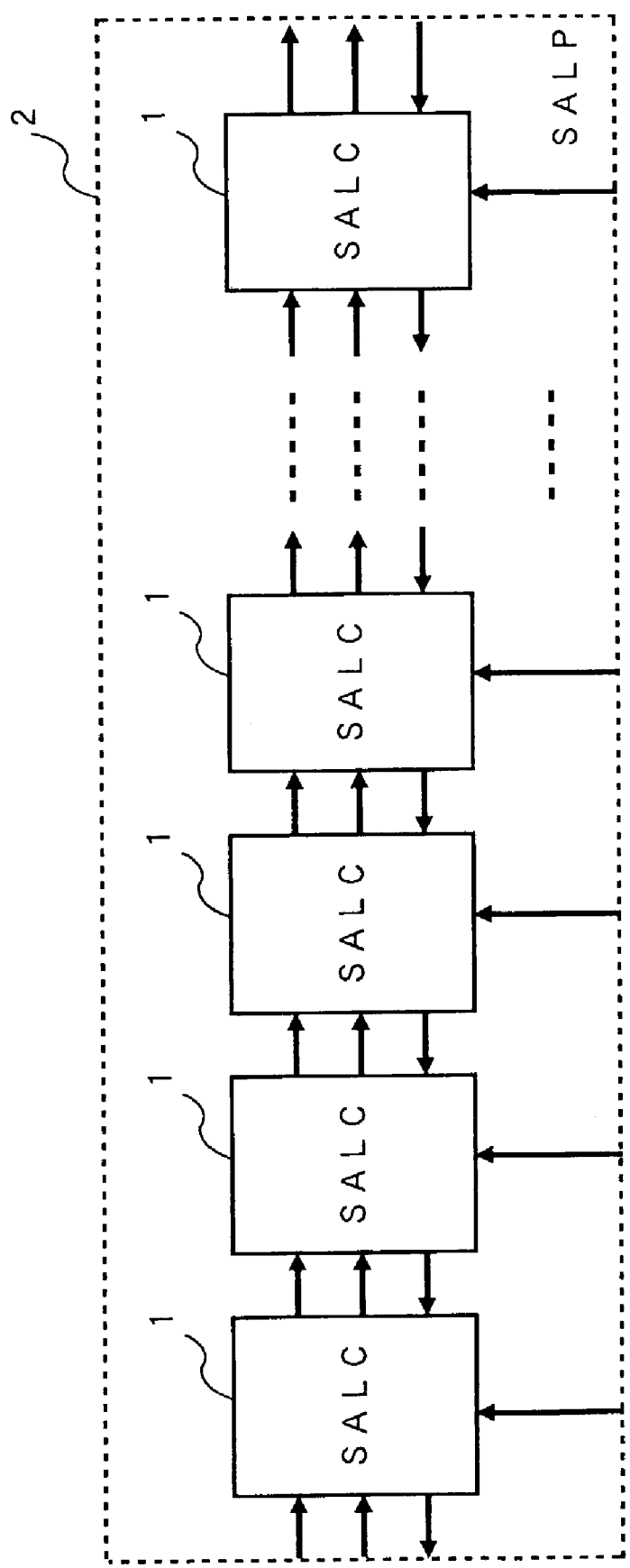
FIG. 3 is a structural diagram showing a serial operation pipeline (SALP) in accordance with an embodiment of the present invention.

FIG. 3 is a diagram showing a structural example of a serial operation pipeline (Serial-ALPipeline, hereinafter referred to as "SALP") in which a plurality of SALCs 1 are connected in a cascade fashion. A SALP 2 realizes various multi-bit operation commands by the combination of simple serial commands.

In the case where completion of logic operations by one path is required, one (or more) SALC 1 is sufficient for the adder to be connected, however, in the multiplier, the number of SALCs 1 must be as much as the number of figures. In addition, in the case where a polynomial operation or the like is required, the number of SALCs 1 to be connected must be identical to the number of simultaneous operations or the number of data latches which may be made common.

Figure 4:
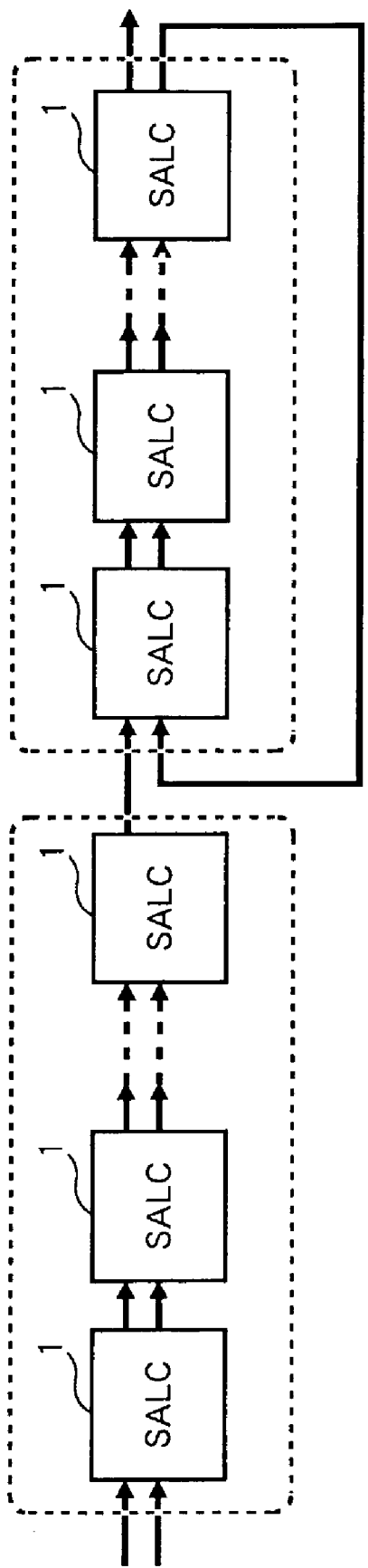
FIG. 4 is a diagram showing a structural example of the SALP when a polynomial is executed.

In the case where a polynomial operation is required, the SALP 2 may be designed in such a manner that the output of a SALC 1 is fed back to the input of a SALC 1 positioned upstream by a few stages, as shown in FIG. 4. Thereby, an arithmetic operation between an operation result (obtained from the downstream side SALC 1) and newly entered data (which is supplied to the upstream side SALC 1) can be executed. Further, a complicated polynomial expression, such as executing an arithmetic operation among values of data in mid-course of processing, can be achieved in one path.

The SALP 2 can execute various macro commands in cooperation with a plurality of SALCs 1. An example of the operation in this case will be described in detail. A 4-bit multiplier will be described as a simple example hereinafter.

Figure 5A:
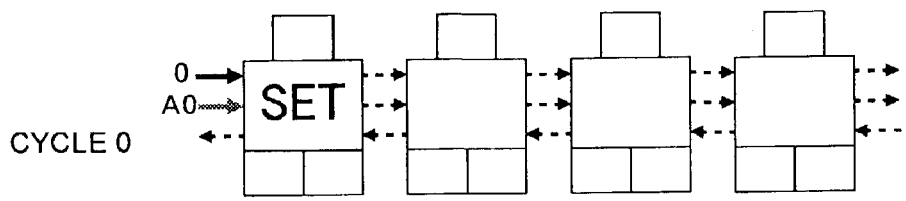
FIGS. 5A to 5P are explanatory diagrams showing an example of the operation of a serial operation pipeline.
Figure 5B:
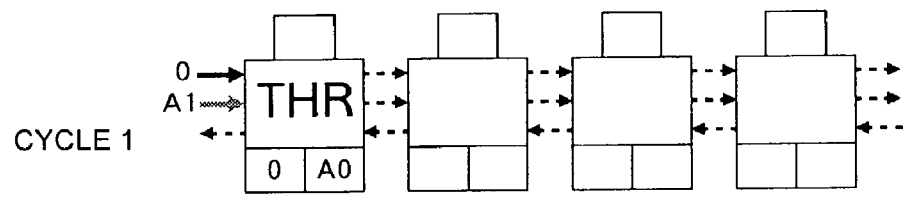
Figure 5C:
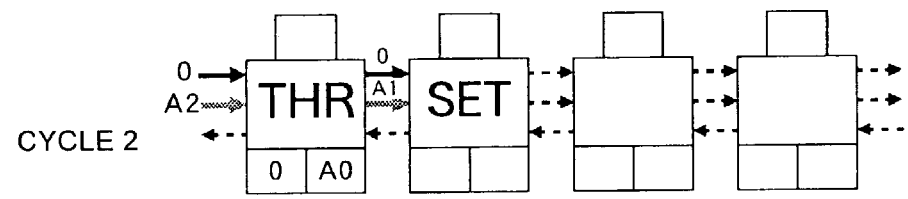
Figure 5D:
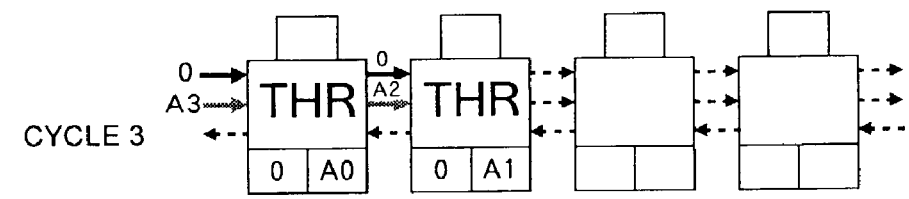
Figure 5E:
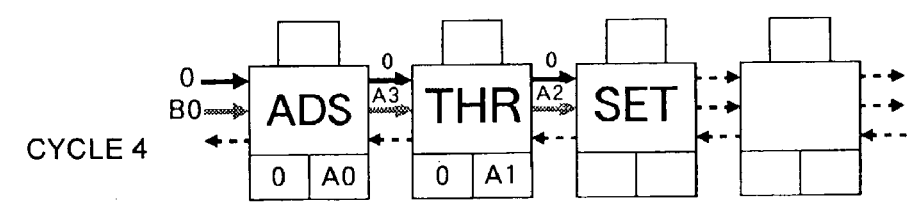
Figure 5F:
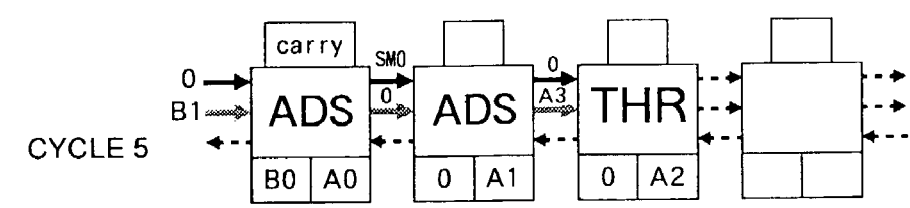
Figure 5G:
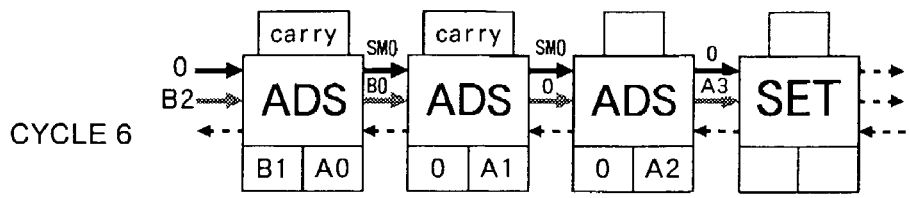
Figure 5H:
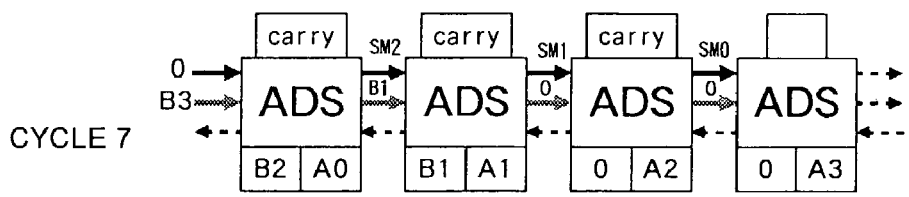
Figure 5I:
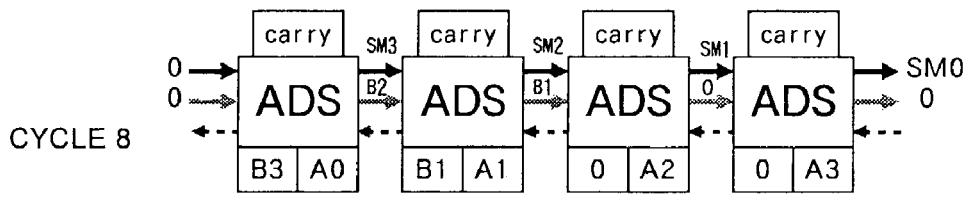
Figure 5J:
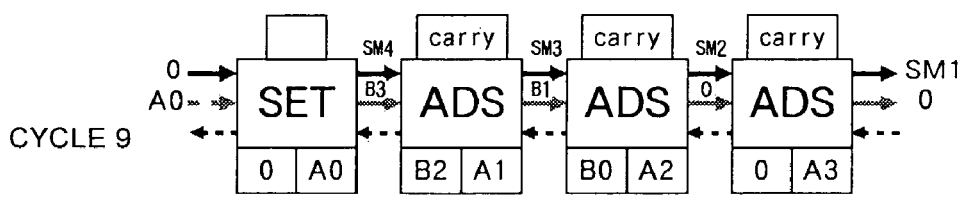
Figure 5K:
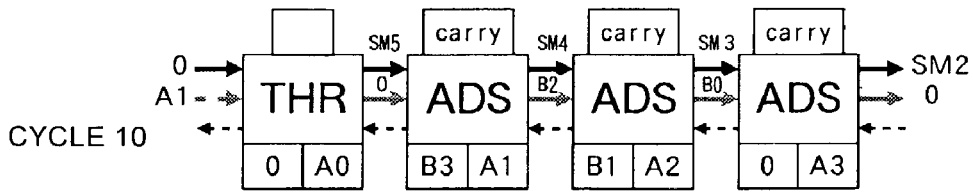
Figure 5L:
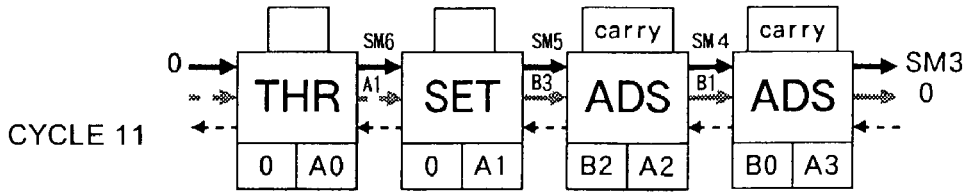
Figure 5M:
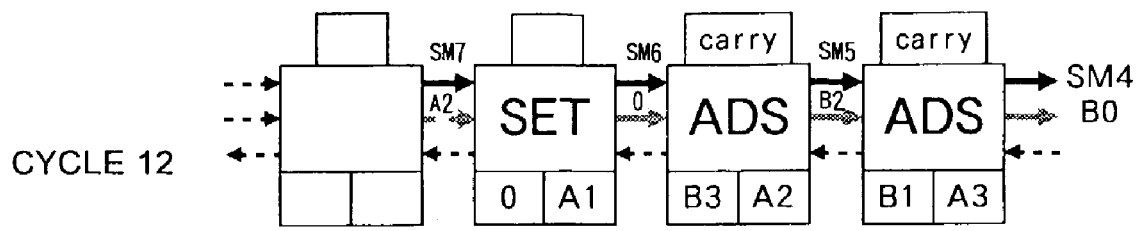
Figure 5N:
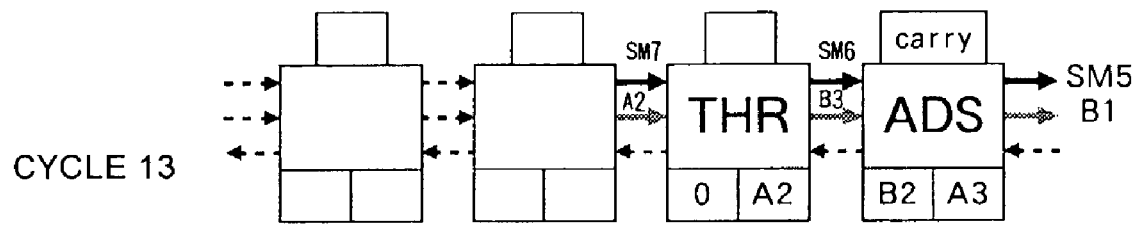
Figure 5O:
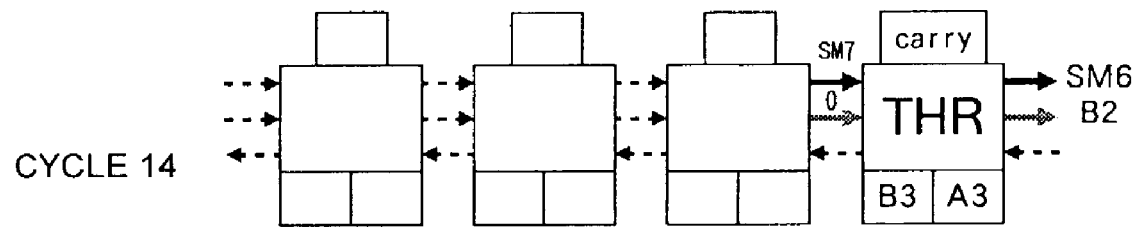
Figure 5P:
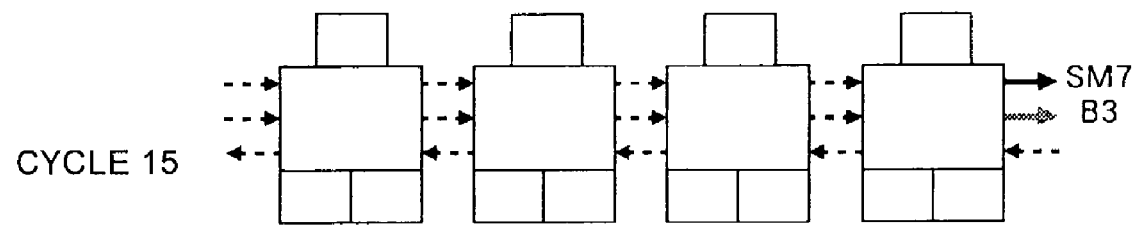

FIGS. 5A to 5P are diagrams showing states of the four SALCs 1 in the SALP 2 where those SALCs 1 are connected in a cascade fashion, as well as the contents of data in those states.

The four-bit multiplication is conducted in such a manner that first data is input to the SALP 2 in a cycle 0 shown in FIG. 5A, and the four-bit multiplication is completed in a sixteenth cycle after the input of subsequent data, the decoding of an instruction, logic operations, latching, and output are conducted for each clock cycle. In the figures, the largest area in each of the SALCs 1 denotes the decoder 10, a portion above the decoder 10 is the carry latch circuit 16, a portion below and to the left of the decoder 10 is the shift latch circuit 14, and a portion below and to the right of the decoder 10 is the control latch circuit 15. Blank portions and broken-line portions indicate that no data or the like exists. References 0, A0 to A3, and B0 to B3 denote data to be subjected to operation, and SM0 to SM7 are operation result data. Characters in the decoder 10 represent instructions where "SET" is data set that means the storage of data in the shift latch circuit 14 and the control latch circuit 15, "THR" is through that means that data is allowed to pass without being stored, and "ADS" is add & shift of data. Also, "carry" represents a carry bit which is latched in the carry latch circuit 16.

In the first cycle (cycle 0), the first data (0, A0) is input in a first SALC 1, and the operation result data (including "through") is output to a downstream SALC 1 after the instruction is decoded and the logic operations are conducted by the decoder 10. The operation is repeated in accordance with instructions that are input simultaneously at a clock timing common to all of the SALCs 1, and the 4-bit multiplication result is finally obtained from the last SALC 1 as SM1 to SM7.

There is a specific operation mode such as float add in the macro commands. In this case, the specific operation mode can be readily realized by changing only the instructions which are input to the respective SALCs 1. For example, in addition to the above-described ADS, the instructions used in the float add are FSUB (subtract for float), SBS (subtract & set), CCHG (controlled change), CSFT (controlled shift), INV (inverse), REV (reverse), SFT (shift), OR, SUB (subtract & cnvset) and NSUB (subtract & RESET). The above-mentioned kinds of instructions are merely examples, and other instructions can also be arbitrarily selected in accordance with the kinds of processing which are executable by the decoder 10.

The SALP 2 according to this embodiment can realize processing performance proportional to a data range since the SALP 2 has the SALCs 1 as a basic structure and can conduct the logic operations in a flexible data range while appropriately changing the state in which the SALCs 1 are connected (for example, 8-bit operation has a performance which is twice that of the 16-bit operation). Also, in the process, as to the data being processed, the bit length of the data may be extended so as to keep the precision of the arithmetic operation. Also, as to the data being processed, by deleting the upper bit and/or lower bit, it is possible to effectively maintain, corresponding to the quality of the data, the significant digit number. In addition, an exponent and a mantissa are additionally processed to enable a float operation.

As described above, in the SALP 2, the throughput becomes 1/(data width) as compared with the parallel operation pipeline, but the area of the computing unit is reduced as much. If the reduced amount of the throughput is allocated to the parallel degree of the pipeline, the costs do not change in principle (if not taking the control into account). Moreover, because each stage of the pipeline is shorted, the processing speed can be made proportionately higher.

The SALP 2 according to this embodiment can execute most logic operations, such as division, a saturation operation, a sum-of-products operation or a polynomial expression. As compared with a computing unit with cascade connections with respect to cost performance as a single operator, it appears that the costs increase in the operation of one element because the throughput is 1/(data width), but the costs become identical by allocating the operation elements in parallel in the manipulation of large pieces of data. Also, logic between the clocks can be cut for each unit of processing size (for example, 1 to 3 bits), and the frequency can be made significantly high since the so-called fan-out is very small. Advantageously, it is possible to connect a crossbar with a very small structure to a leading portion of the pipeline. With this structure, the judgment of the parallel line of the operation elements, the judgment of the bits of a pipeline trailing line can be realized with a very small structure. A scalar process such that an address is calculated or a branch condition is calculated and a process where the processing regions are small, and a parameter changes for each of the regions can be realized by binding the regions.

For that reason, a plurality of SALPs 2 are employed, thereby being capable of forming an arithmetic device that conducts efficient logic operations.

Arithmetic Device

Figure 6:
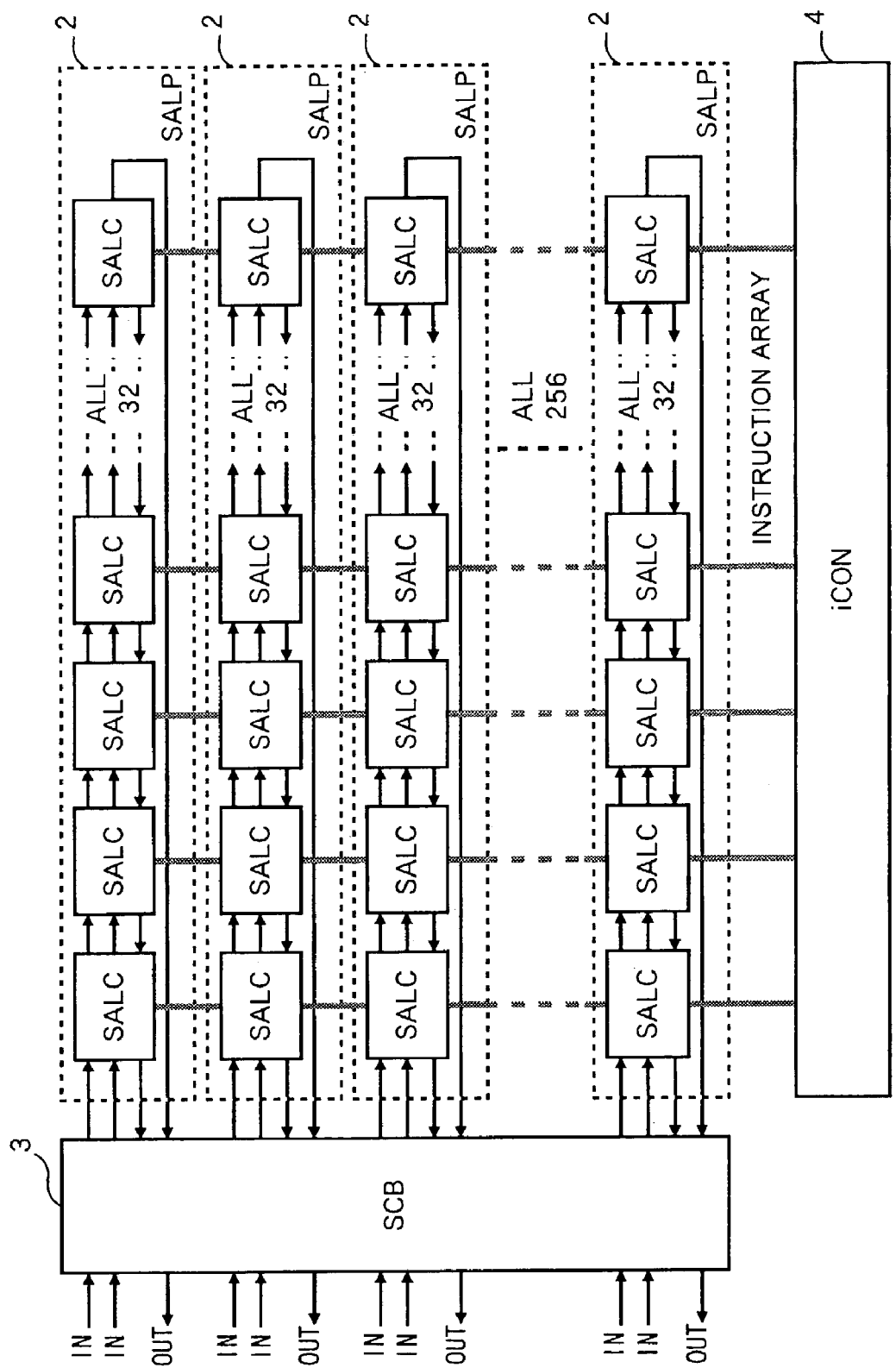
FIG. 6 is a structural diagram showing an arithmetic device in accordance with an embodiment of the present invention.

FIG. 6 is a structural diagram showing an arithmetic device including 256 SALPs 2 in which 32 SALCs (SALCs 1 shown in FIG. 1) are connected in a cascade fashion.

Each of the SALPs 2 is connected in parallel with an external controller or a serial crossbar (SCB) 3 which is connected to a controller, a network or the like. The SCB 3 includes an address decoder and a plurality of crossbar switches, and exchanges 256 lines in a small area, and can distribute data to a desired line by two phases consisting of address entering (control phase) and data entering (control phase) into a bus from the external controller or the like.

An instruction array which is a group of n rows of instructions and m columns of instructions (n×m instructions) is input into each of the 256 SALPs 2 from the instruction controller (iCON) 4, and the logic operations and the input/output lines of data are controlled independently.

In one embodiment, for all the SALPs 2, common instruction arrays are input at the same time. Alternatively, common instruction arrays may be input after designating the address of each SALP to which the common instruction array is to be input. Furthermore, instruction arrays with individual contents may be individually input to respective SALPs 2.

The iCON 4 serially outputs each of the m columns to the first stage of the individual SALCs of respective SALPs, and for each of the output columns, allows execution of an instruction of the column in the stage, deletes the executed instruction from the column, and outputs (or shifts) the column to the next downstream stage. The iCON 4 repeats these processes of allowing execution, deleting the instruction, and outputting the column to the next stage until all n instructions have been deleted.

This structure will be described with reference to an example of one SALP 2 shown in FIG. 7.

Figure 7:
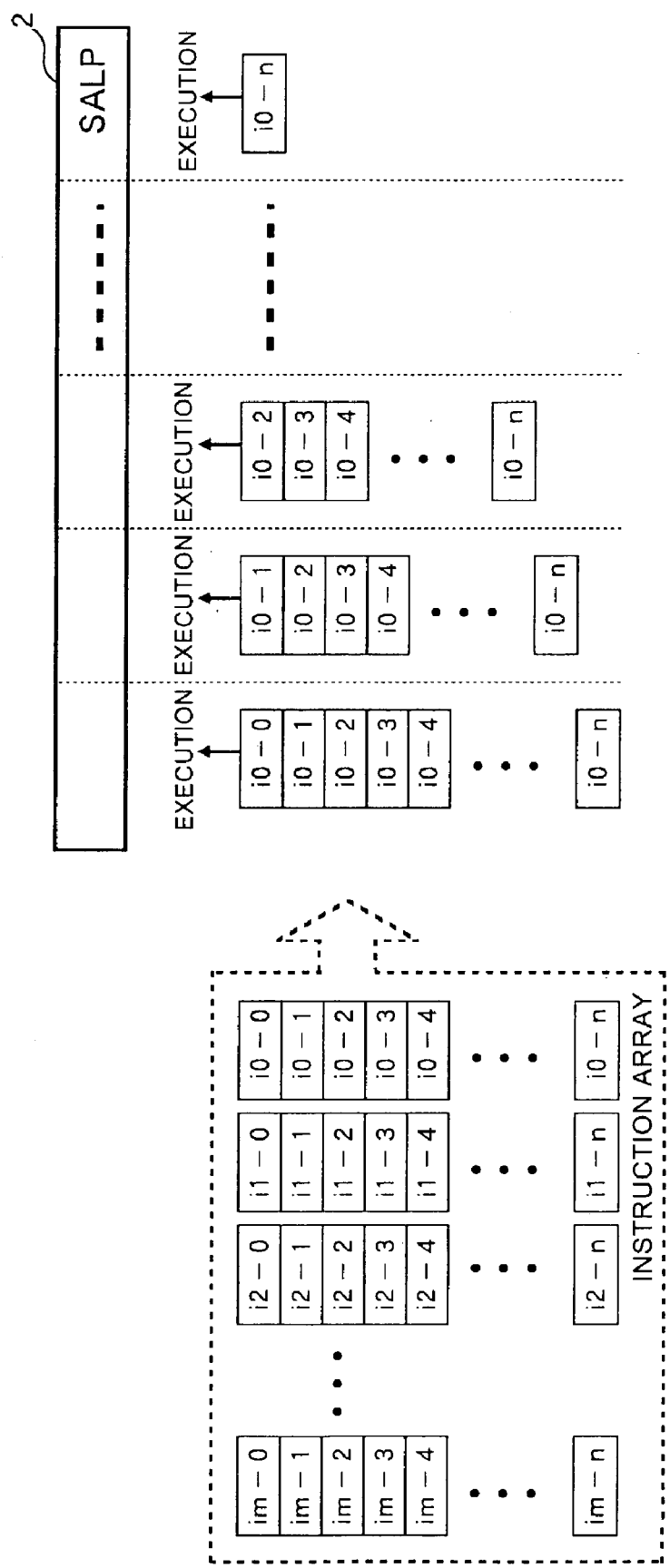
FIG. 7 is a schematic diagram showing the operation of the serial operation pipeline (SALP) included in the arithmetic device according to the present invention.

The instruction array indicated by a broken-line block at the left side of FIG. 7 is held in a memory of the ICON 4 (FIG. 6), sequentially read from the instructions in the right column of the broken-line block for each of the clock cycles, and then input to the SALCs of the SALP 2. When a leading instruction is executed, the executed instruction is deleted and the remaining instructions in the column are input to a downstream SALC, and all of the instructions at a subsequent column are input to the upstream SALC. This is repeated until all of the instructions are deleted.

A retrieve or data loop can be embedded in the instruction array. In this case, a complicated DFG described in the background of the invention can be described by one path, thereby simplifying the control mode of the arithmetic pipeline operation.

Subsequently, an operation example of the arithmetic device will be described.

In this example, there is described an example in which the multiplication and addition of "1010" (data A)×"1100" (data B)+"00101101" (data C) shown in FIG. 8A are conducted using one SALP 2.

The output operation result data becomes "11000101", and since its operation process is characteristic, the process from an initial cycle to the output of the operation result data will be described with reference to the drawings.

The prepared data is aligned in two lines as shown in FIG. 8B and sequentially input to the arithmetic device (SALP 2) beginning with the data positioned the most to the right side.

In order to match data sizes, MSBs are acquired four times at the time of acquiring data and then added to a leading portion of the data A. The added data does not affect the operation result. In the data descriptions at the right side of FIG. 8B, "intermediate data" is so-called intermediate data which is used in an operation process, and also does not affect the operation result.

The instruction array shown in FIG. 8C is prepared for this example.

The instructions used in multiplication and addition in this example are of three kinds, i.e., "SET" (data set), "ADS" (addition and shift) and "THR".

The instruction "SET" is to set reference data (data input to a downstream data input terminal) in the shift latch circuit 14, to set output data (data input to an upstream data input terminal) in the control latch circuit 15, and to set "0" in the carry latch circuit 16.

The instruction "ADS" is to conduct a shift only operation in cases where the data latched in the control latch circuit 15 is "0", and add and shift operations in other cases. The shift operation is to use the data latched in the shift latch circuit 14 as the reference data. In the case of an addition operation, the carry bit is changed (change carry).

The instruction "THR" is to send input data (output data and reference data) to a downstream side without any changes.

Figure 9:
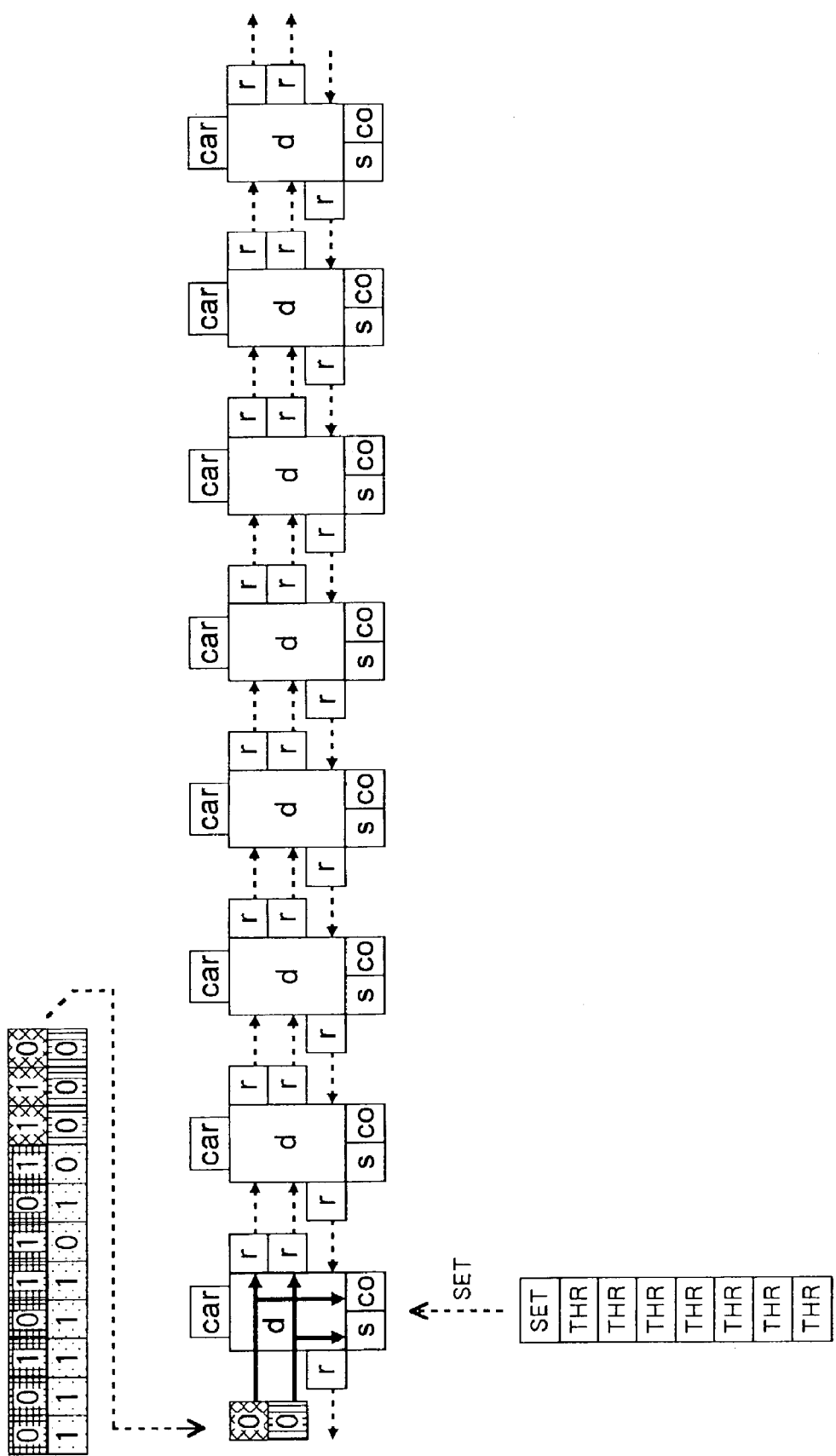
FIG. 9 is an explanatory diagram showing the operation state of the arithmetic device in accordance with the present invention (first cycle)

In the first cycle, an array of eight instructions to whose leading portion "SET" is allocated is input to the instruction input terminal CON of a first SALC as shown in FIG. 9, and two pieces of data in the rightmost column of FIG. 8B are input to data input terminals D1$i$ and D2$i$, respectively. Since the instruction is "SET", those two pieces of data "0" and "0" are set in the shift latch circuit 14 and the control latch circuit 15 of the SALC. Since no carry bit is generated in the carry latch circuit 16, "0" is set.

Figure 10:
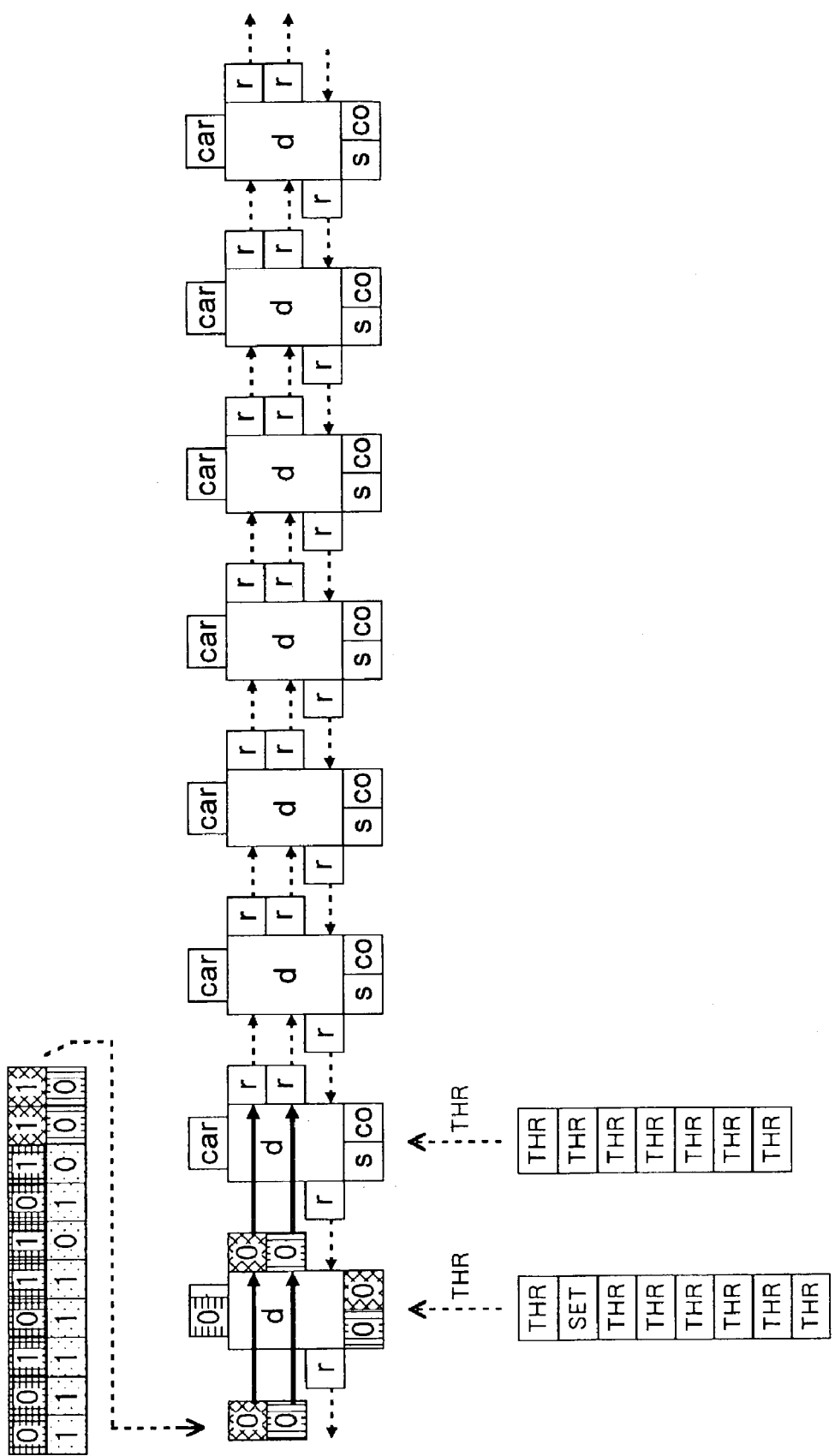
FIG. 10 is an explanatory diagram showing the operation state of the arithmetic device in accordance with the present invention (second cycle)

In the second cycle, as shown in FIG. 10, two pieces of data in a subsequent column are input to the respective data input terminals D1$i$ and D2$i$ of the first SALC, and the two pieces of data "0" and "0" which were input in the previous cycle are input to a second SALC from the data latch circuit 11 and the reference latch circuit 12. The instructions which were input to the first SALC in the previous cycle, except for "SET" which already has been executed, are output to the second SALC, and the instructions in the next column shown in FIG. 8C are input to the first SALC. Since the instructions at both the first and second SALCs are "THR", the respectively input two pieces of data "0" and "0" are transmitted to a downstream SALC without any changes.

Figure 11:
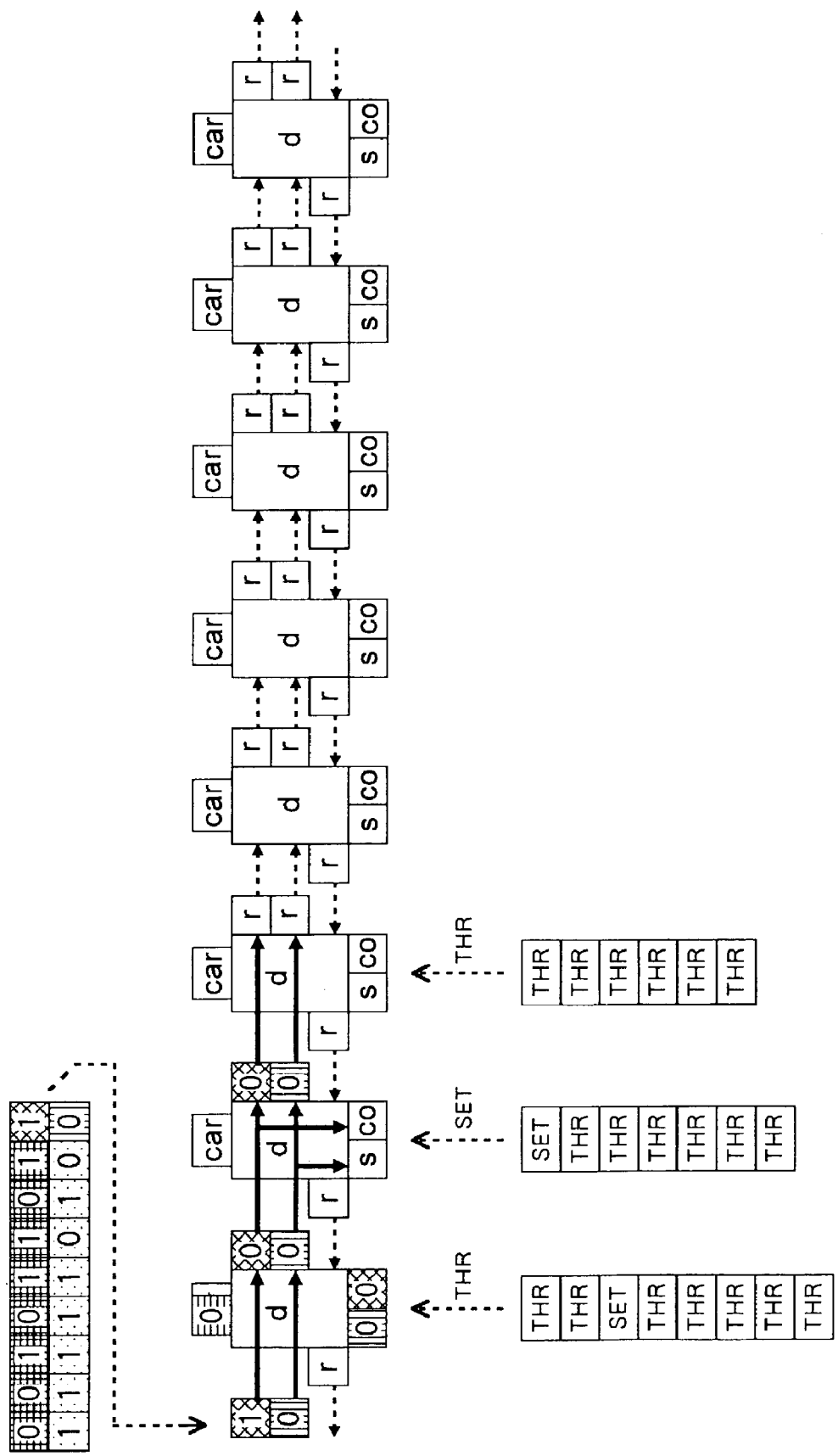
FIG. 11 is an explanatory diagram showing the operation state of the arithmetic device in accordance with the present invention (third cycle)
Figure 12:
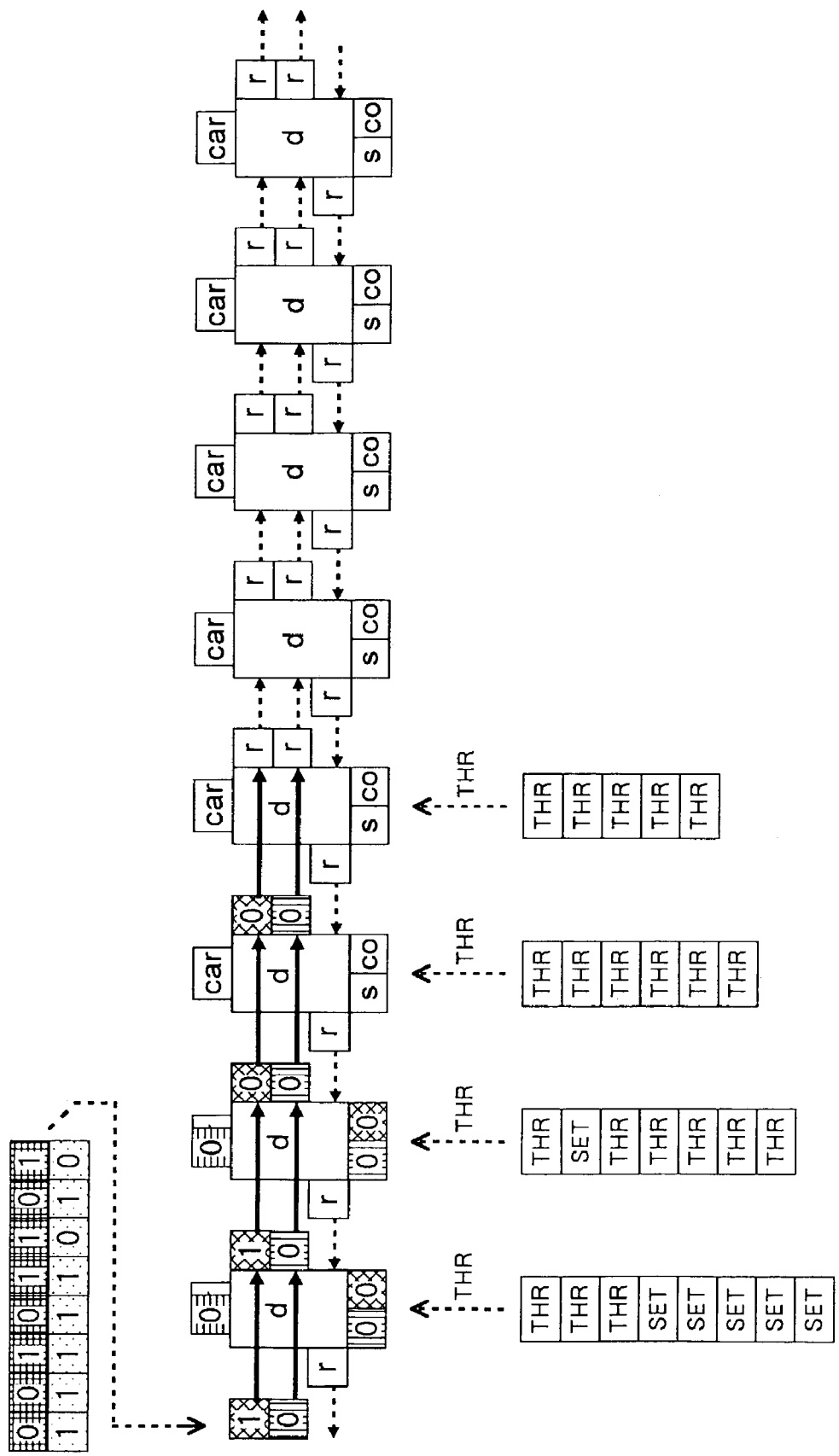
FIG. 12 is an explanatory diagram showing the operation state of the arithmetic device in accordance with the present invention (fourth cycle)

In the third cycle, two pieces of data in a further subsequent column are input to the data input terminals D1$i$ and D2$i$ of the first SALC, respectively, as shown in FIG. 11. The instructions which were input in the second cycle, except for the instructions which already have been executed, are input to the SALCs other than the first SALC, and the instructions in the next column of FIG. 8C are input to the first SALC. Since the instructions input to the first and third SALCs are "THR", and the instruction input to the second SALC is "SET", the data "0" and "0" which are input to the second SALC are then set in the shift latch circuit 14 and the control latch circuit 15 of the second SALC, and the two pieces of data which have been input to the first and third SALCs, respectively, are transmitted to the downstream SALC without any change. The operation in the fourth cycle is shown in FIG. 12, and the operation execution and the data shift are conducted by the SALCs in the same procedure as that described above.

Figure 13:
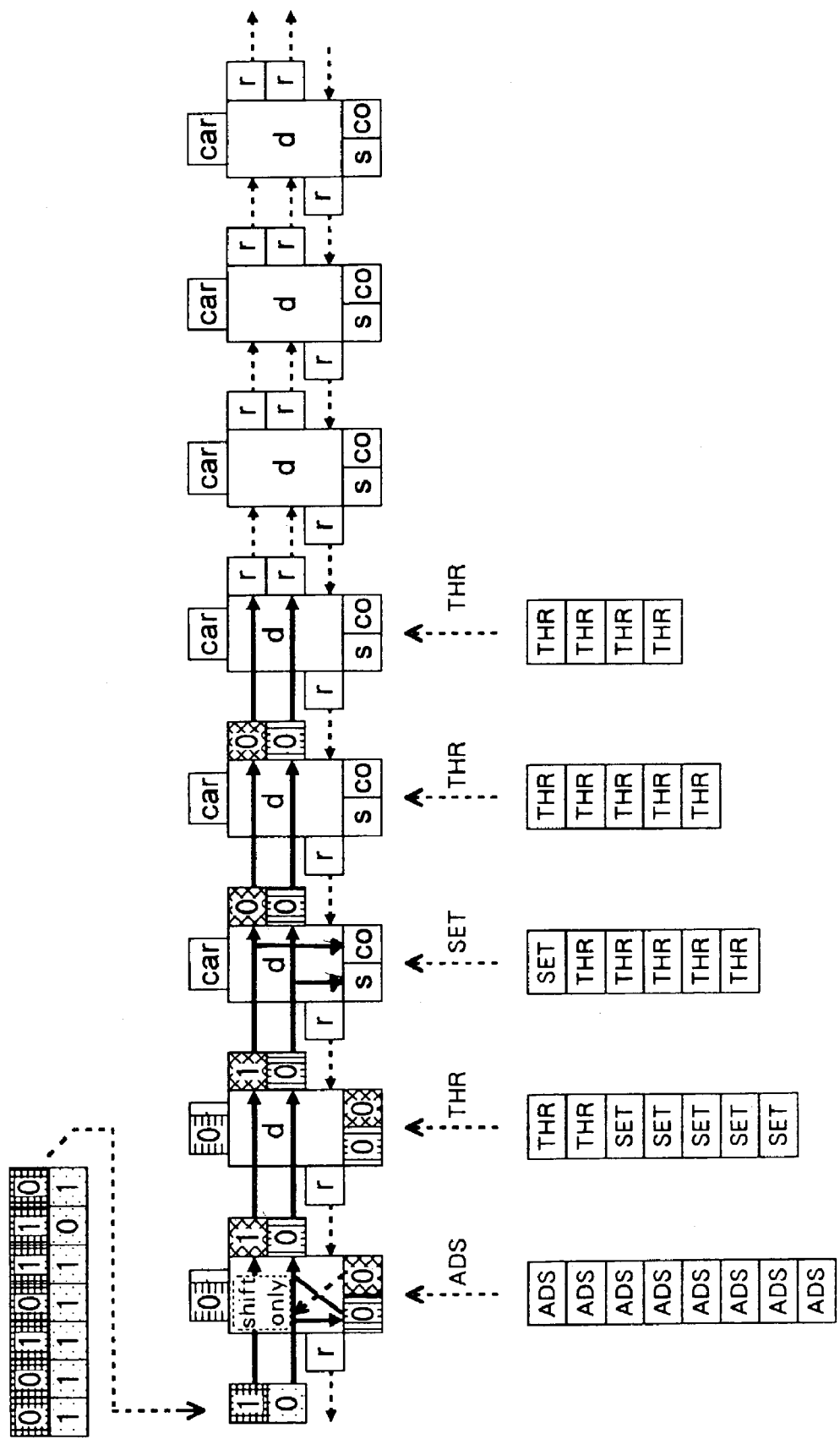
FIG. 13 is an explanatory diagram showing the operation state of the arithmetic device in accordance with the present invention (fifth cycle)
Figure 14:
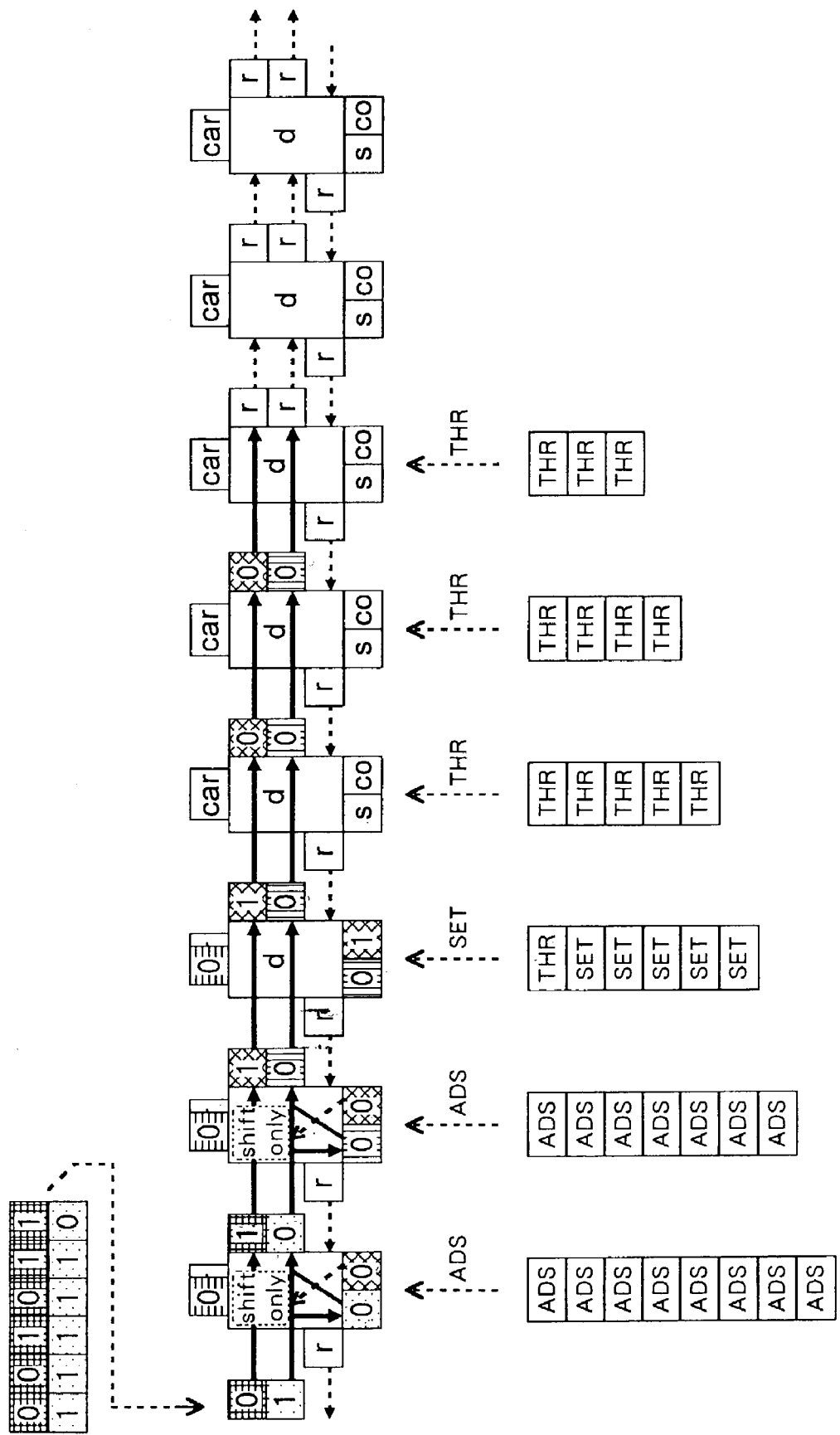
FIG. 14 is an explanatory diagram showing the operation state of the arithmetic device in accordance with the present invention (sixth cycle)
Figure 15:
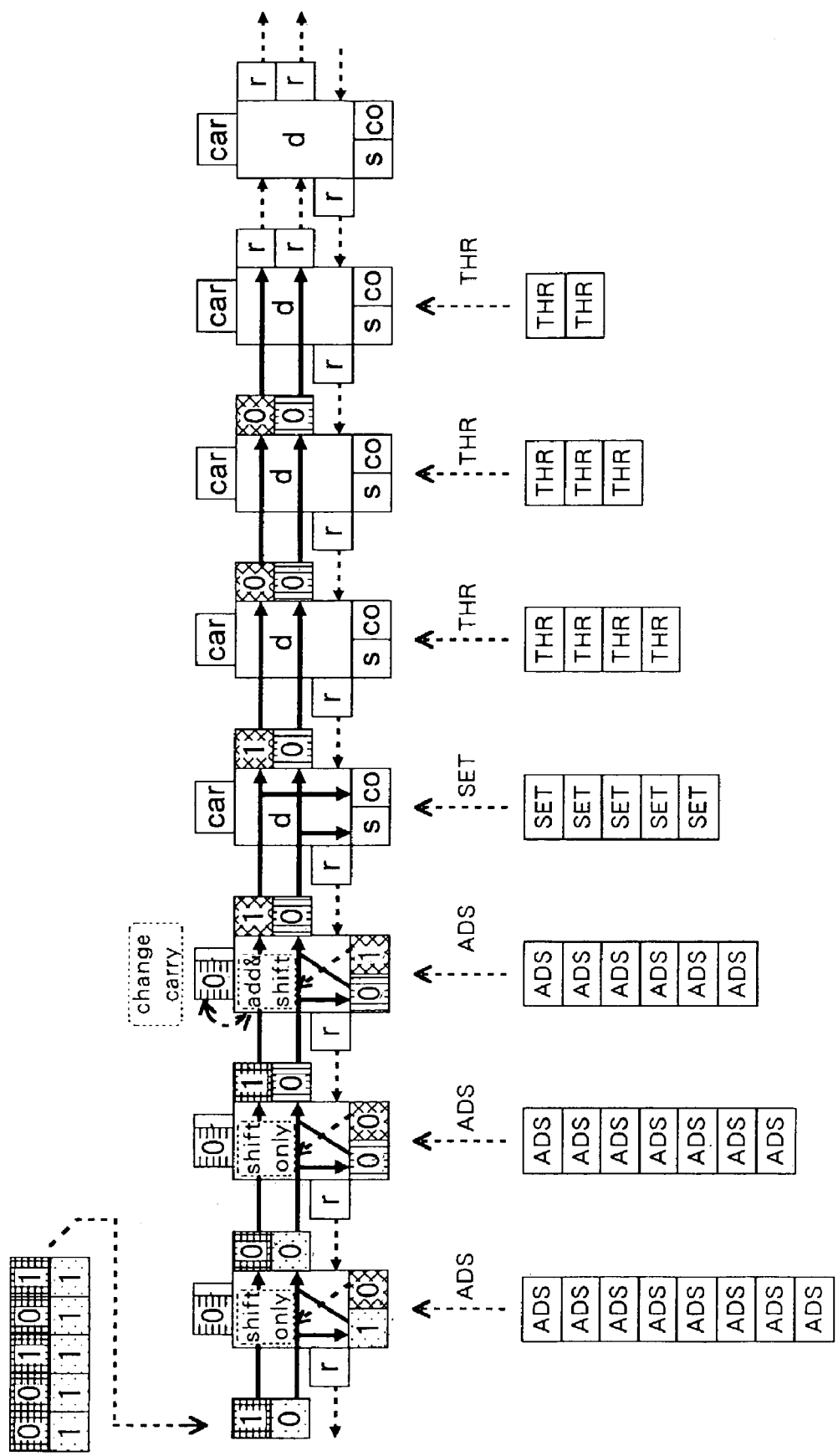
FIG. 15 is an explanatory diagram showing the operation state of the arithmetic device in accordance with the present invention (seventh cycle)
Figure 16:
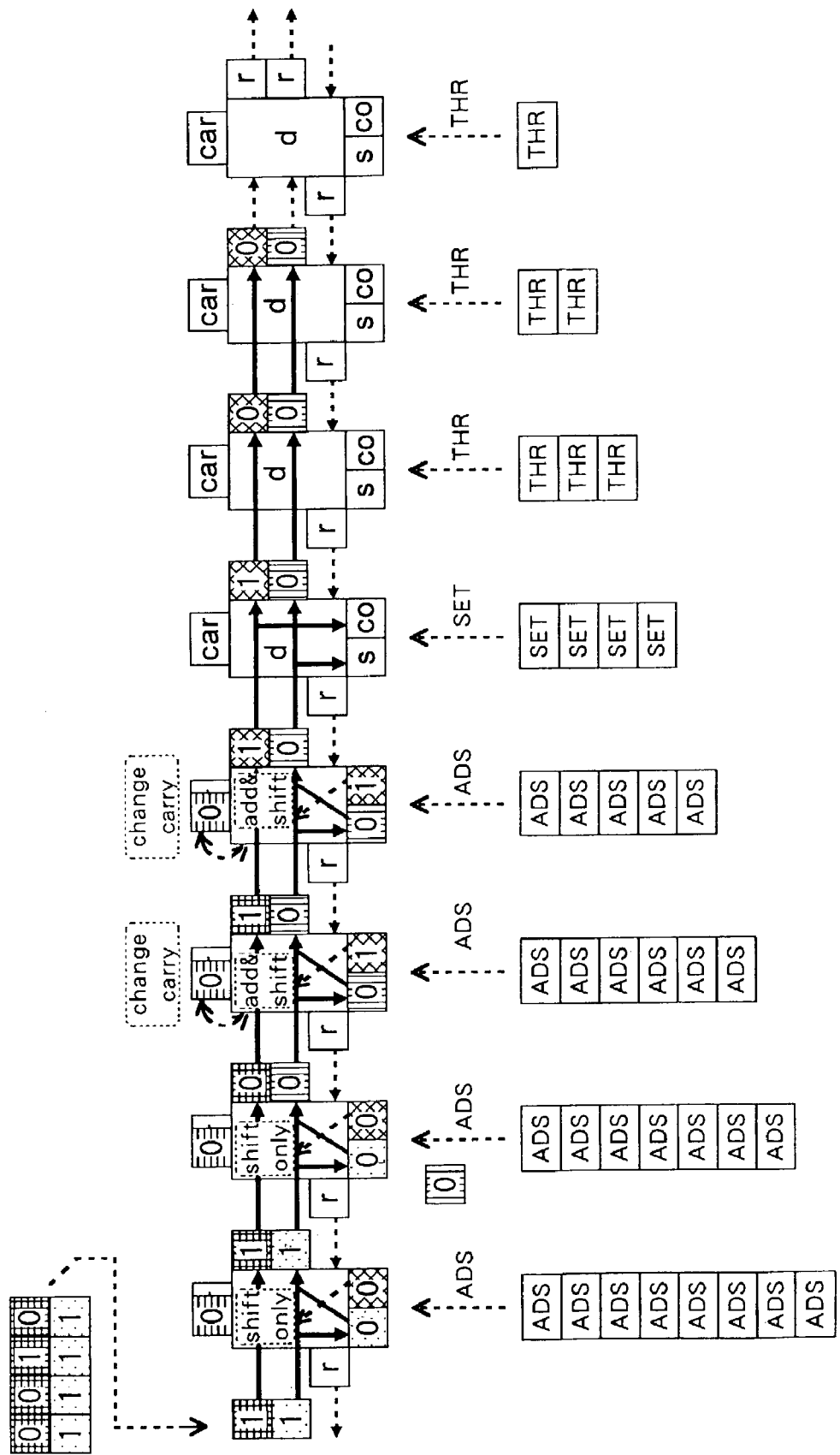
FIG. 16 is an explanatory diagram showing the operation state of the arithmetic device in accordance with the present invention (eighth cycle)
Figure 17:
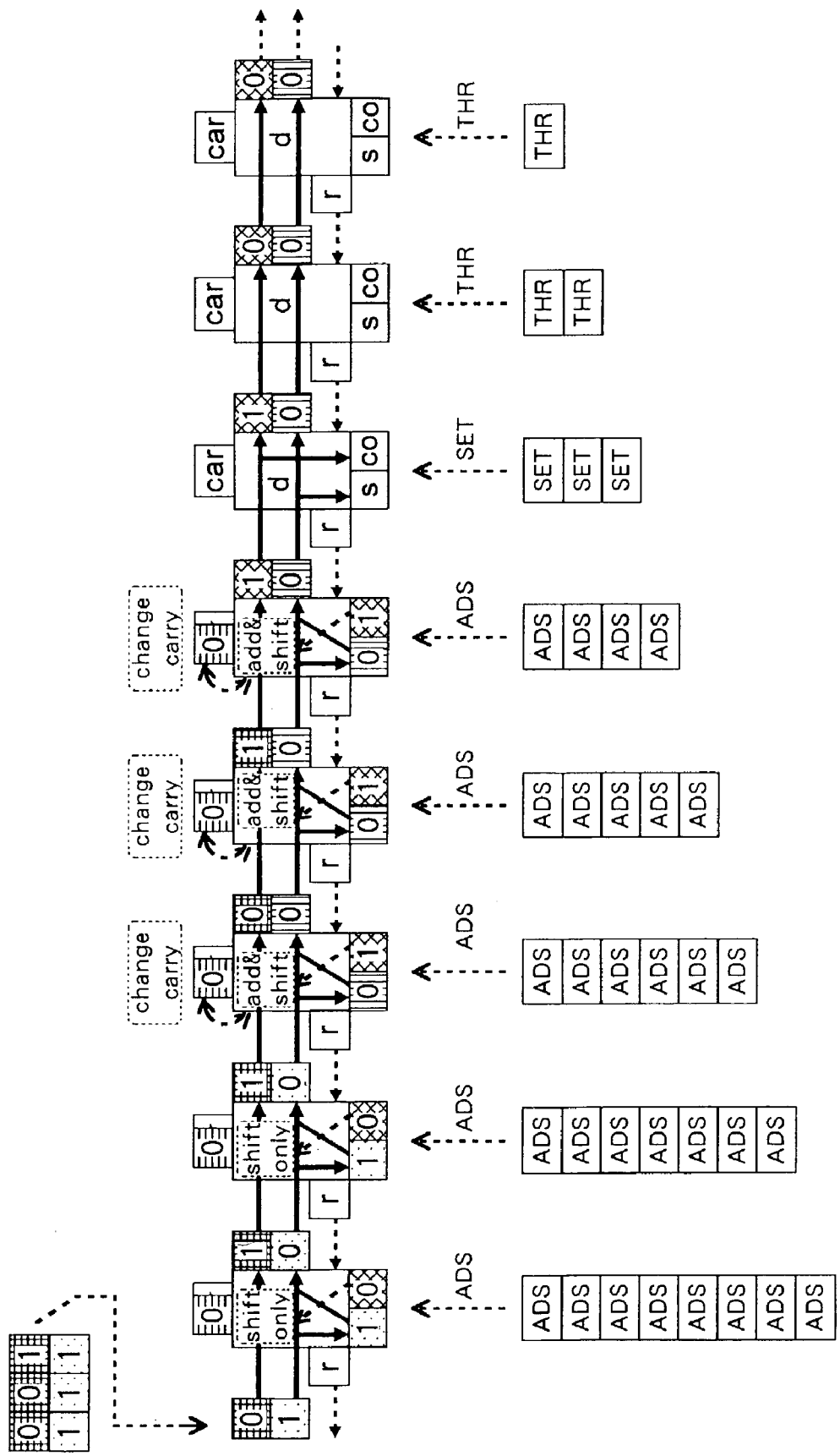
FIG. 17 is an explanatory diagram showing the operation state of the arithmetic device in accordance with the present invention (ninth cycle)
Figure 18:
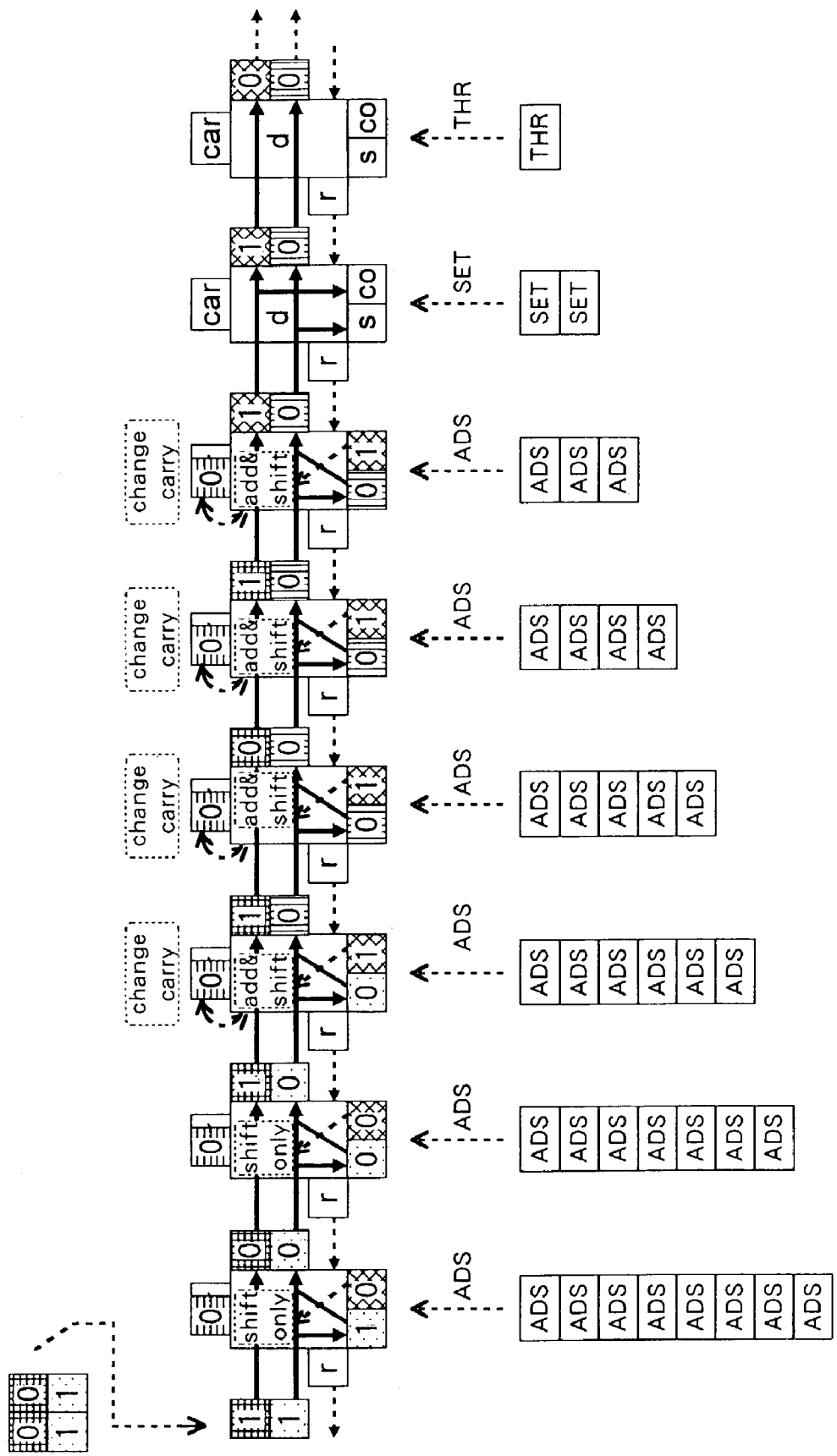
FIG. 18 is an explanatory diagram showing the operation state of the arithmetic device in accordance with the present invention (tenth cycle)
Figure 19:
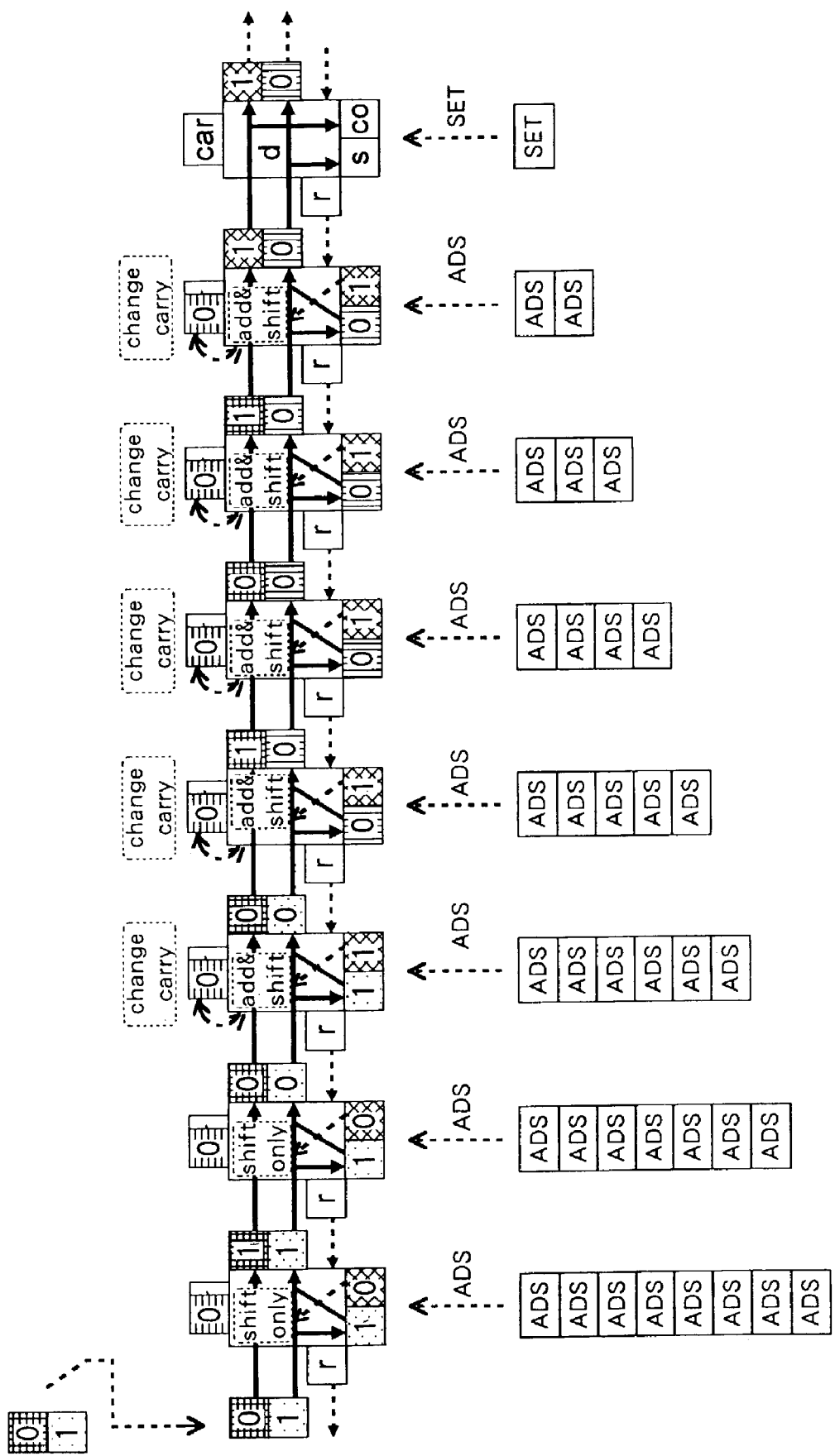
FIG. 19 is an explanatory diagram showing the operation state of the arithmetic device in accordance with the present invention (eleventh cycle)
Figure 20:
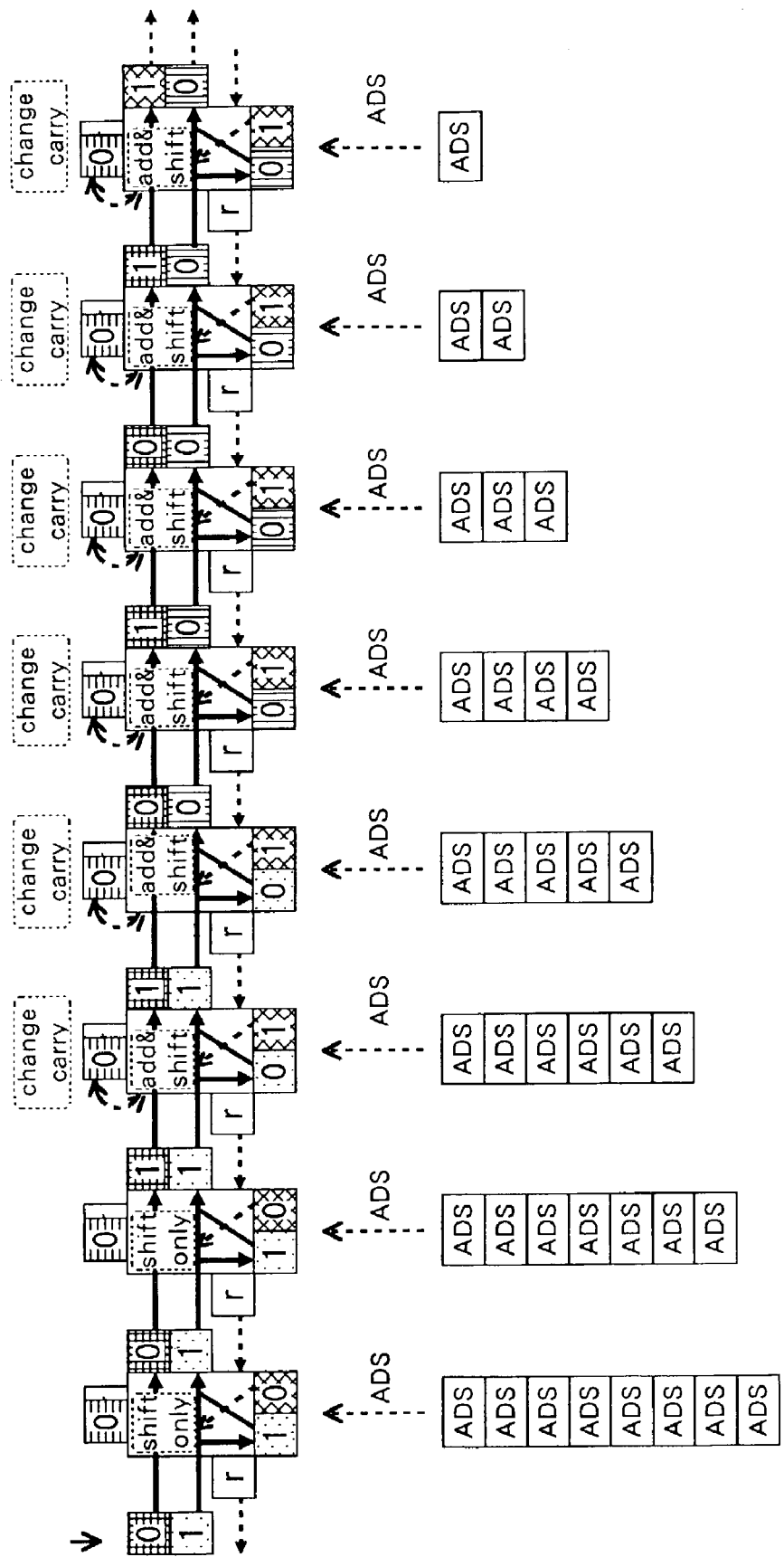
FIG. 20 is an explanatory diagram showing the operation state of the arithmetic device in accordance with the present invention (twelfth cycle)

In the fifth cycle, as shown in FIG. 13, the operation execution and the data shift are conducted between the respective SALCs in the same procedure as that described above, except that the instruction of "ADS" is input to the first SALC. In the first SALC, since data latched in the control latch circuit 15 is "0", only a shift operation is conducted. Likewise, in the sixth cycle (FIG. 14) to the twelfth cycle (FIG. 20), the operation execution and the data shift are conducted by the SALCs in the same procedure as that described above.

Figure 21:
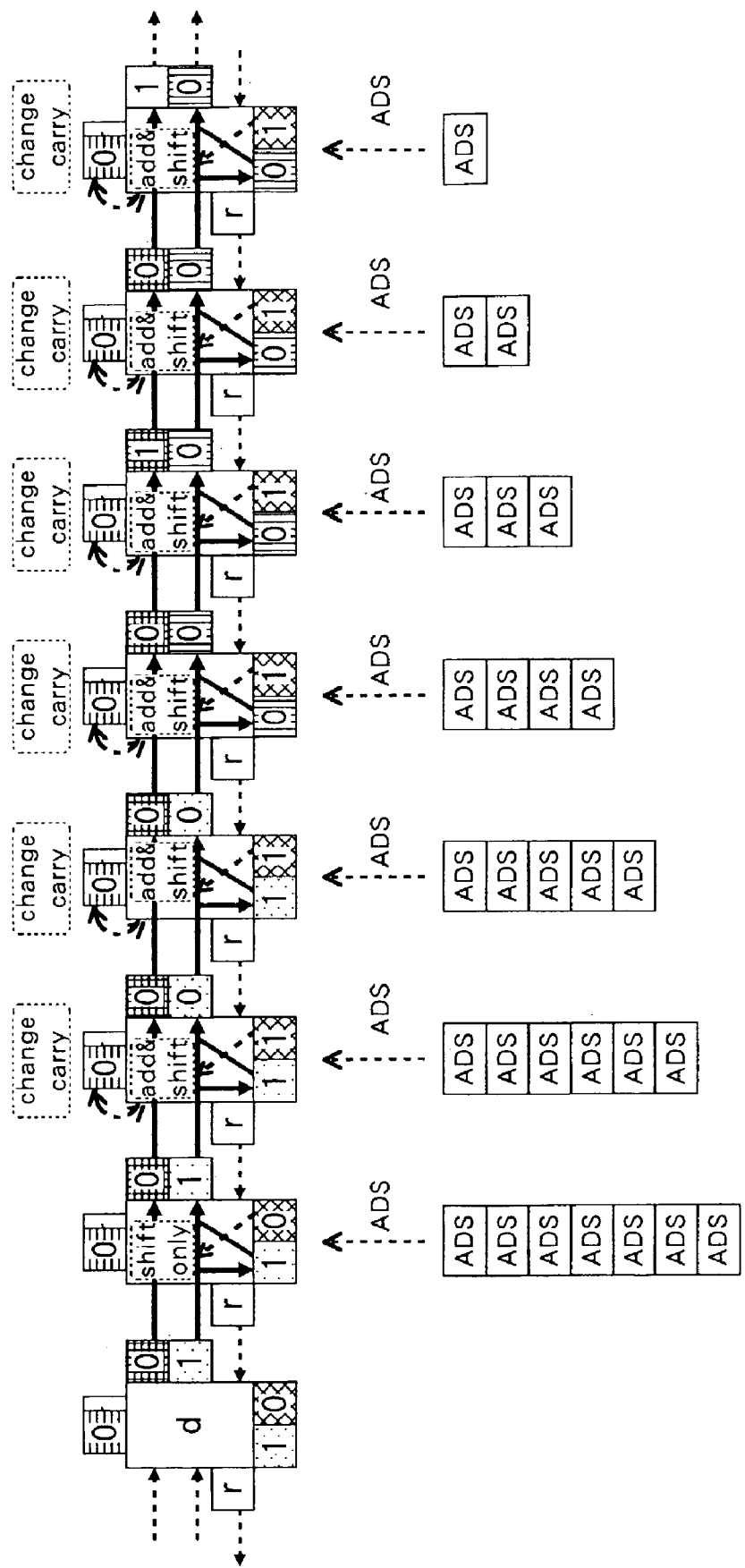
FIG. 21 is an explanatory diagram showing the operation state of the arithmetic device in accordance with the present invention (thirteenth cycle)

In the thirteenth cycle (FIG. 21) and subsequent cycles, there is no data input to the first SALC, and the data which is latched in the data latch circuit 11 and the reference latch circuit 12 of the upstream SALC (the first SALC in case of FIG. 21) is input to a downstream SALC (the second SALC in case of FIG. 21). As to the instructions, the executed instructions are deleted, and the instructions are input to the downstream SALCs as in the above-mentioned manner. The data latched in the data latch circuit 11 of the last SALC becomes the LSB of data representative of a final operation result.

Figure 22:
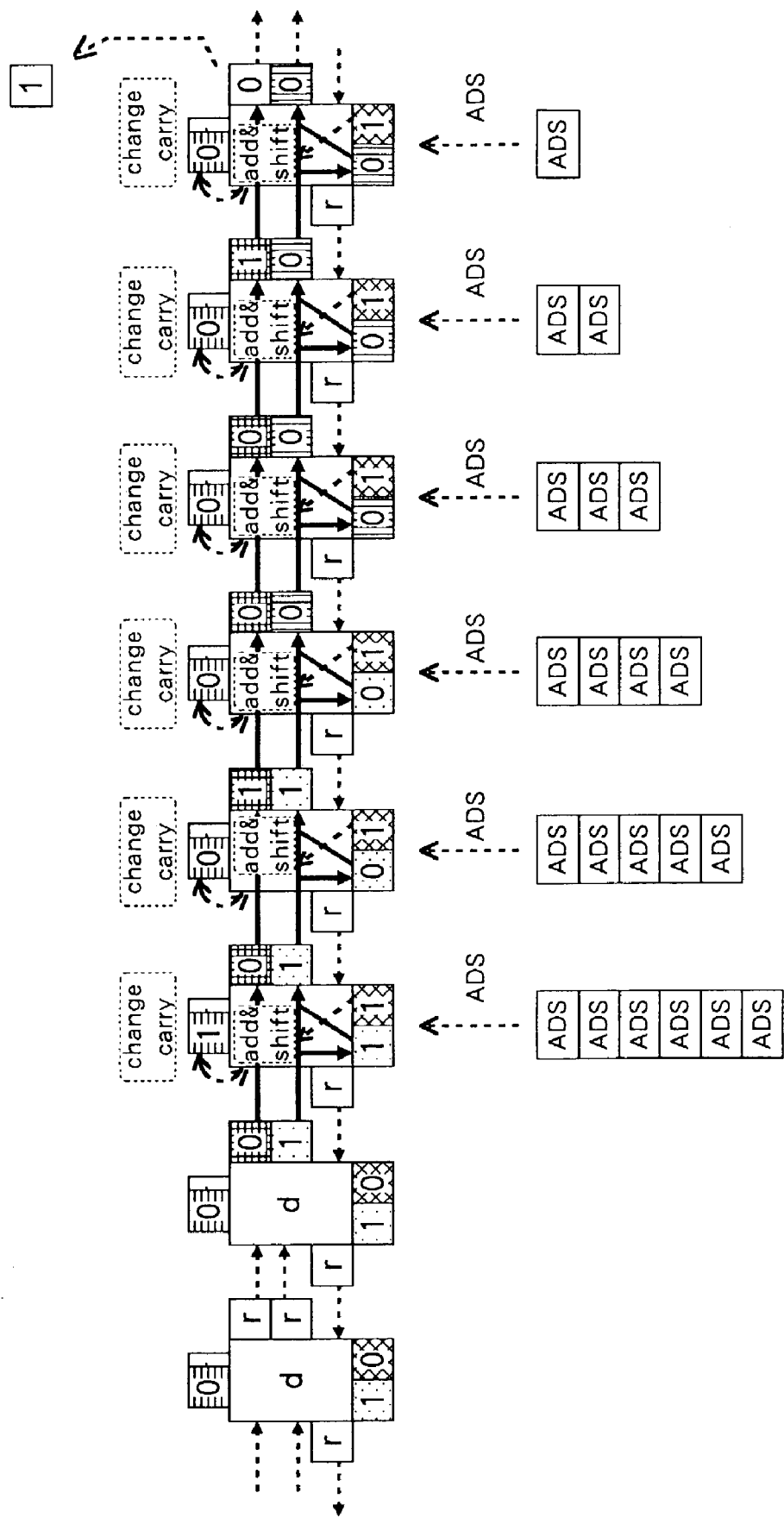
FIG. 22 is an explanatory diagram showing the operation state of the arithmetic device in accordance with the present invention (fourteenth cycle)
Figure 23:
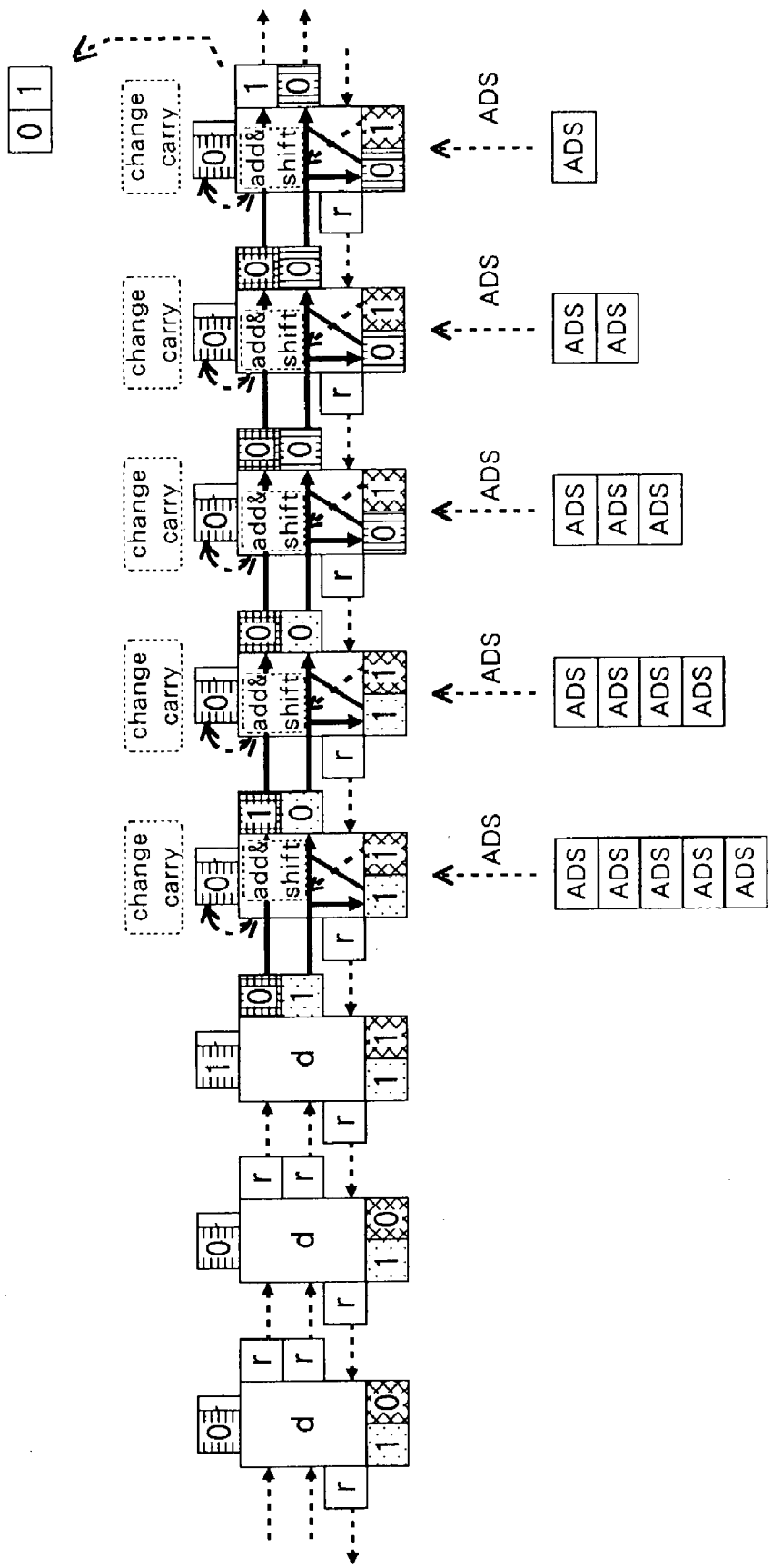
FIG. 23 is an explanatory diagram showing the operation state of the arithmetic device in accordance with the present invention (fifteenth cycle)
Figure 24:
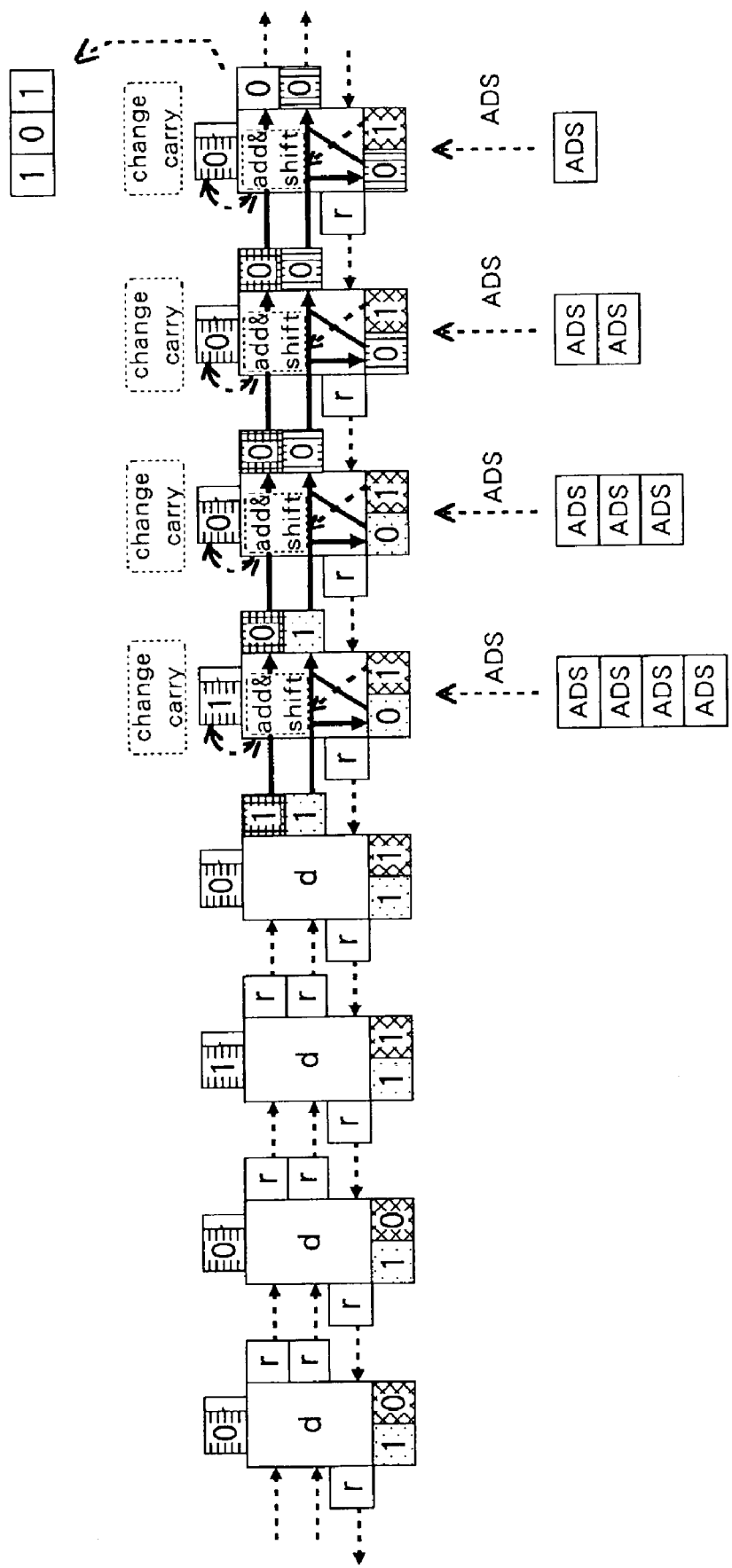
FIG. 24 is an explanatory diagram showing the operation state of the arithmetic device in accordance with the present invention (sixteenth cycle)
Figure 25:
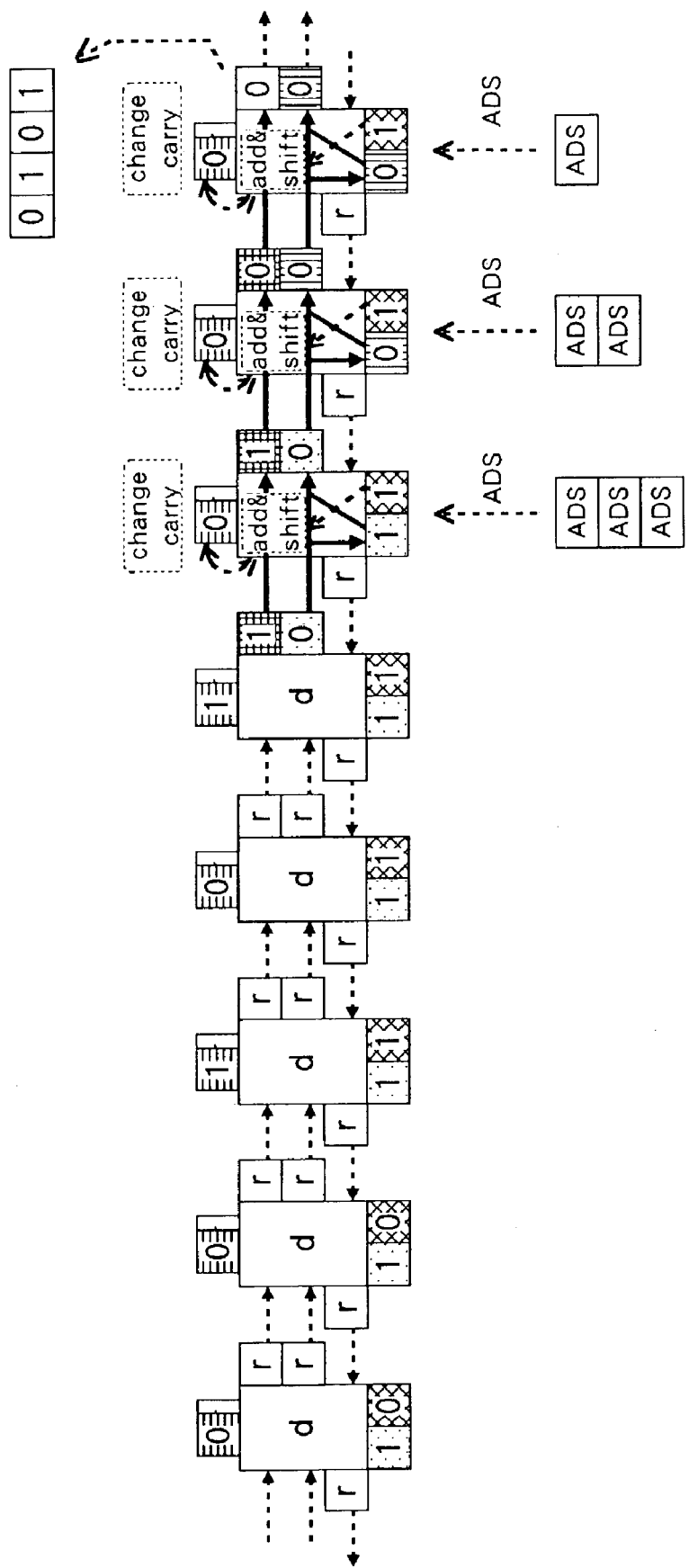
FIG. 25 is an explanatory diagram showing the operation state of the arithmetic device in accordance with the present invention (seventeenth cycle)
Figure 26:
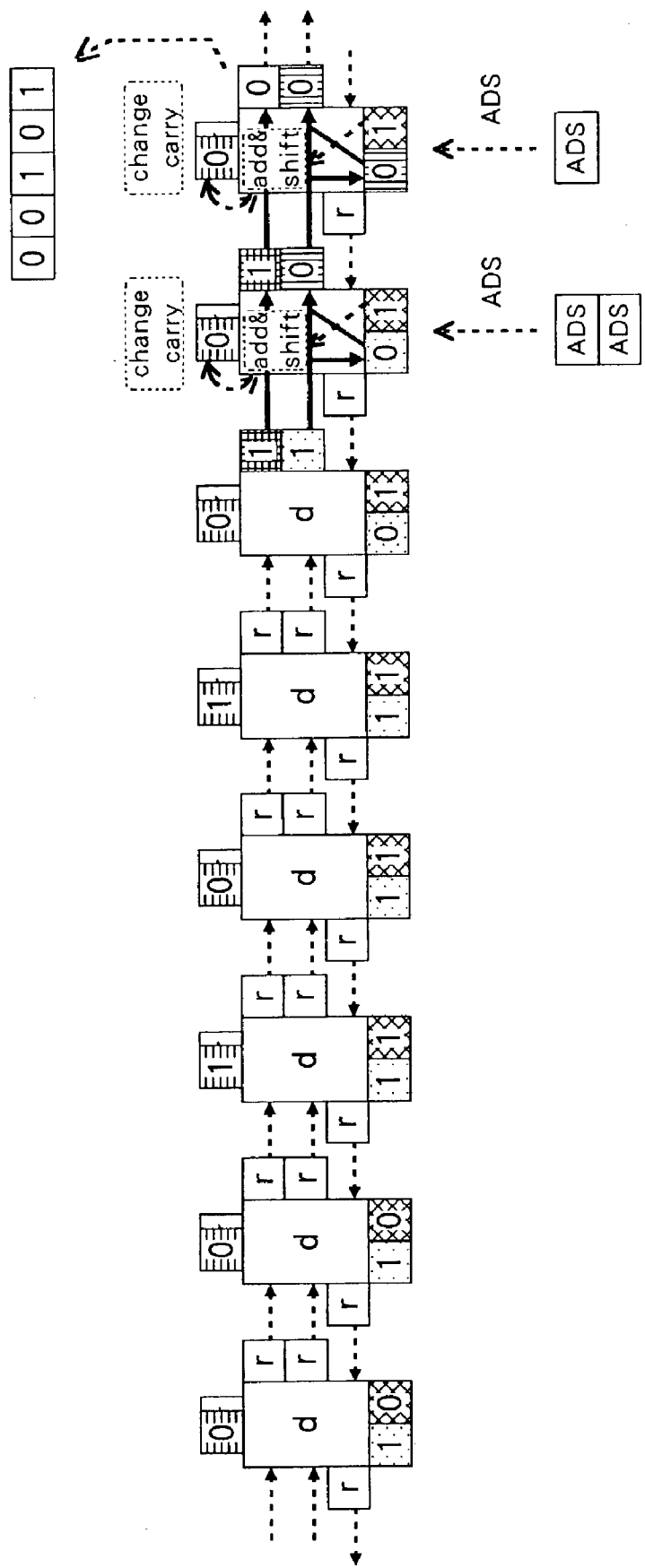
FIG. 26 is an explanatory diagram showing the operation state of the arithmetic device in accordance with the present invention (eighteenth cycle)
Figure 27:
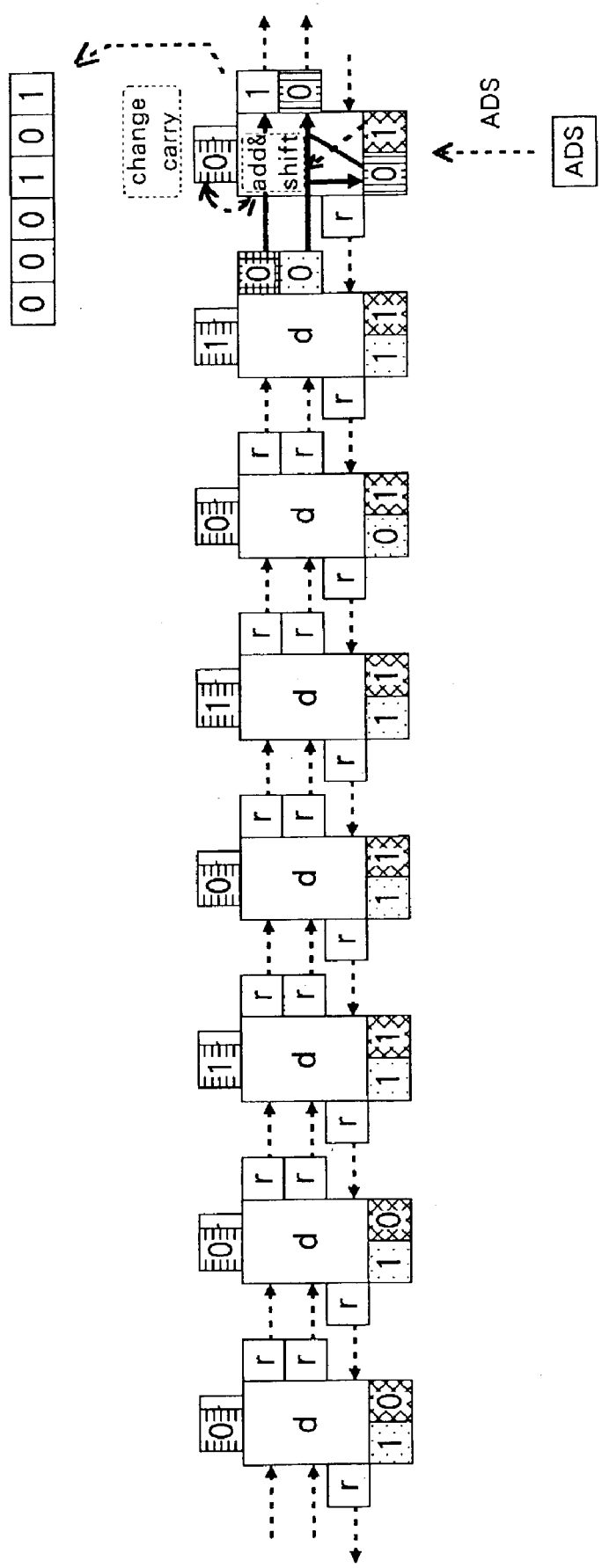
FIG. 27 is an explanatory diagram showing the operation state of the arithmetic device in accordance with the present invention (nineteenth cycle)
Figure 28:
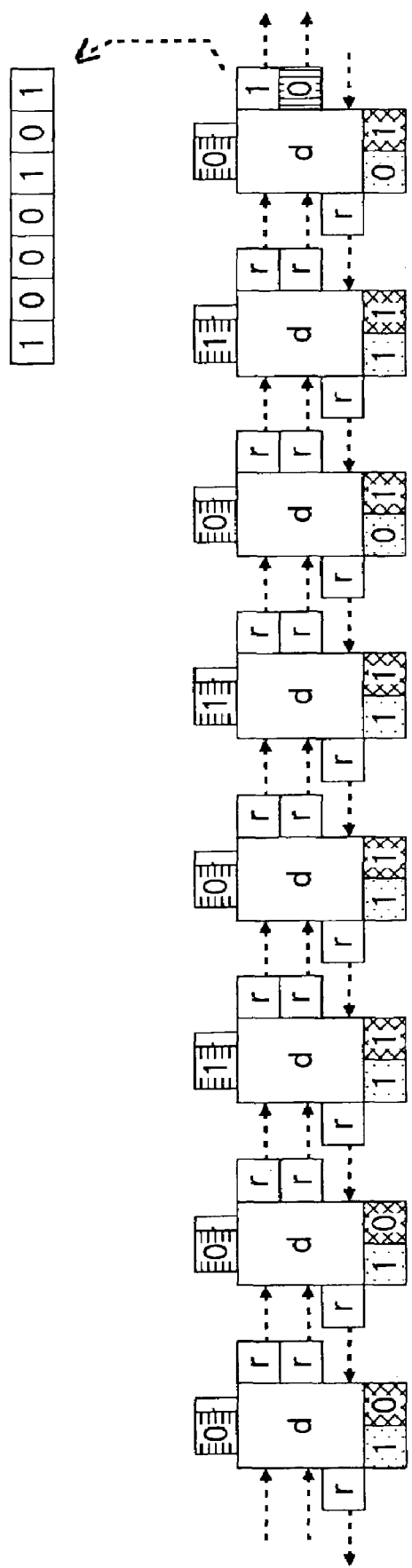
FIG. 28 is an explanatory diagram showing the operation state of the arithmetic device in accordance with the present invention (twentieth cycle)
Figure 29:
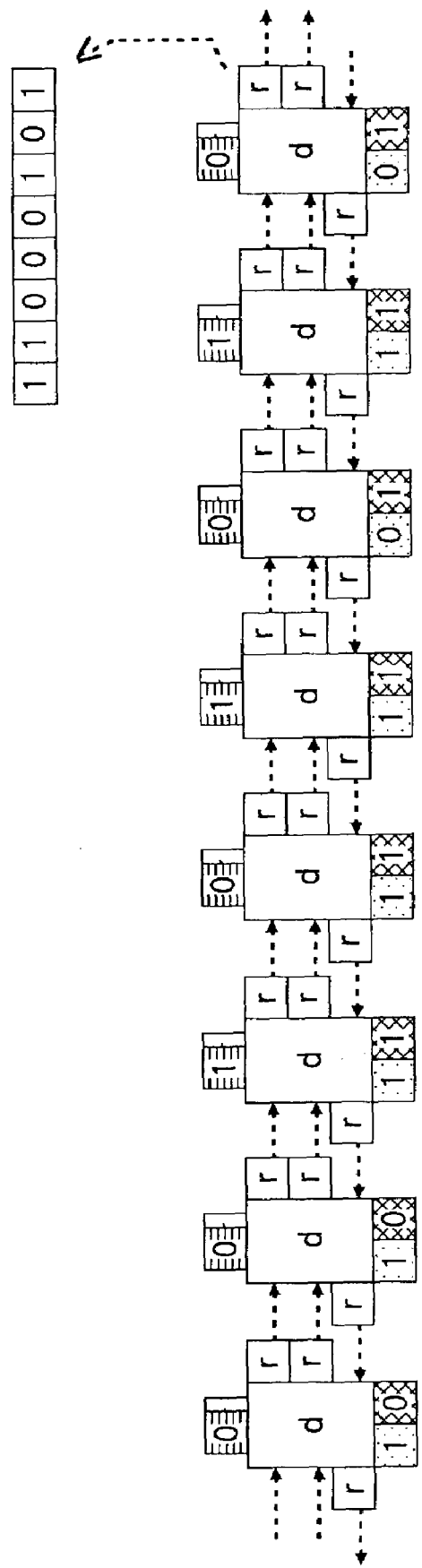
FIG. 29 is an explanatory diagram showing the operation state of the arithmetic device in accordance with the present invention (twenty-first cycle).

The above-mentioned operation is repeated in the fourteenth cycle (FIG. 22) to the twenty-first cycle (FIG. 29), and the data latched in the data latch circuit 11 of the last SALC 1, respectively, is extracted, to thereby obtain the final operation result shown in the upper portion of FIG. 29.

As described above, the arithmetic device according to this embodiment is arranged in such a manner that a plurality of SALCs with a feedback function are connected at plural stages in a cascade manner in a SALP 2. Further, a plurality of SALPs 2 may be connected in parallel with each other in plural lines with respect to the SCB 3. In addition, the arithmetic operations made by the individual SALCs can be individually controlled by an instruction array from the iCON 4. Accordingly, various logic operations (addition, subtraction, multiplication and division operations), combinations thereof, saturation operations, sum-of-products operations, polynomial expressions or the like can be realized by common hardware with ease and flexibility. For that reason, the arithmetic device according to this embodiment can cope with even a change in the application of a logic operation without any increase in cost.

Also, since the individual SALCs 1 have a feedback function (the SALP 2 also has such a function due to the feedback function of the SALCs 1), there can be readily constructed a general-purpose serial operation pipeline that realizes a complicated processing flow with an extemporaneous and explosive amount of operations with respect to various data sizes.

Also, since the data arrangement, its execution procedure and so on can be arbitrarily installed into the instruction array, the data path can be advantageously simplified (linearly).

The above-mentioned arithmetic device can particularly function as an effective tool with respect to logic operations where the amount of instructions are relatively large with respect to the input/output data. The arithmetic device can execute complicated operations such as texture mapping without replacing any hardware. In this case, when the texture is not put in one fragment, surrounding fragments are entered plural times.

Also, the arithmetic device may include a lookup table that defines a plurality of functions, and a function of rewriting the contents of the lookup table by a throughput as much as the address cycle, thereby being capable of arithmetically calculating various functions in a multiplexed manner.

As was apparent from the above-mentioned description, according to the present invention, there can be provided a general-purpose serial operation pipeline that realizes a complicated processing flow with an extemporaneous and explosive amount of operations with respect to various data sizes.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A serial operation pipeline, comprising:
   a plurality of arithmetic-logic circuits connected in a cascade fashion, each of the arithmetic-logic circuits capable of being controlled independently and being operable together with other of the arithmetic-logic circuits, at least one of the plurality of arithmetic-logic circuits including a first line for outputting data from an upstream stage to a downstream stage, a second line for feeding back reverse data from the downstream stage to the upstream stage, and a latch circuit that latches the data on the first and second lines;

wherein each of the plurality of arithmetic-logic circuits includes a decoder for executing a process including an operation corresponding to contents of an externally supplied instruction to produce an execution result, and for outputting data representative of the execution result to a selected one of the first and second lines;

wherein the first line includes a pair of lines for outputting first output data and second output data to the downstream stage, and the latch circuit includes a first data latch circuit that latches the first output data, a second data latch circuit that latches the second output data, a carry latch circuit that latches a carry resulting from an operation executed by the decoder for the operation of a succeeding figure, and a shift latch circuit that delays one of the first output data and the second output data for a given period of time.

2. The serial operation pipeline as claimed in claim 1, wherein the latch circuit further includes a reverse latch circuit that latches the reverse data fed back from the downstream stage to the upstream stage, and a control latch circuit that latches control data for controlling an operation of the data latched in the first and second data latch circuits and the reverse latch circuit.

3. The serial operation pipeline as claimed in claim 1, wherein the data to be processed by the decoder is data of a unit processing size.

4. The serial operation pipeline as claimed in claim 1, wherein the data to be processed by the decoder has a bit length which is the shortest that can be processed in one clock cycle that determines the operation timing of the plurality of arithmetic-logic circuits.

5. The serial operation pipeline as claimed in claim 1, wherein the first line includes a forward line for outputting to the downstream stage the data received from the upstream stage or an operation result based on the data received from the upstream stage, and the second line includes a backward line for outputting to the upstream stage the reverse data received from the downstream stage or an operation result based on the reverse data received from the downstream stage.

6. An arithmetic device, comprising:
a switchable connector operable to switchingly connect data input/output lines of plural systems;
a plurality of serial operation pipelines connected in parallel with the switchable connector; and
an instruction receive mechanism operable to receive externally supplied instructions for the plurality of serial operation pipelines;
each of the plurality of serial operation pipelines including a plurality of arithmetic-logic circuits connected in a cascade fashion, each of the arithmetic-logic circuits being operable together with other of the arithmetic-logic circuits, and
each of the plurality of arithmetic-logic circuits including a forward line for outputting to a downstream stage data received from an upstream stage or an operation result based on the data received from the upstream stage, a backward line for feeding back to the upstream stage reverse data received from the downstream stage or an operation result based on the reverse data received from the downstream stage, a decoder for executing a process corresponding to an externally supplied instruction to produce an execution result and for outputting data representative of the execution result to a selected one of the forward and backward lines, and a latch circuit for synchronizing data output from each of the lines with respect to other of the arithmetic-logic circuits;

wherein the forward line includes a pair of lines for outputting first output data and second output data to the downstream stage, and the backward line includes a line for outputting the reverse data; and the latch circuit in each of the plurality of arithmetic-logic circuits includes:
a first data latch circuit that latches the first output data;
a second data latch circuit that latches the second output data;
a reverse latch circuit that latches the reverse data;
a carry latch circuit that latches a carry resulting from an operation executed by the decoder for the operation of a succeeding figure; and
a shift latch circuit that delays one of the first output data and the second output data for a given period of time.

7. An arithmetic device, comprising:
a switchable connector operable to switchingly connect data input/output lines of plural systems;
a plurality of serial operation pipelines connected in parallel with the switchable connector; and
an instruction receive mechanism operable to receive externally supplied instructions for the plurality of serial operation pipelines;
each of the plurality of serial operation pipelines including a plurality of arithmetic-logic circuits connected in a cascade fashion, each of the arithmetic-logic circuits being operable together with other of the arithmetic-logic circuits, and
each of the plurality of arithmetic-logic circuits including a forward line for outputting to a downstream stage data received from an upstream stage or an operation result based on the data received from the upstream stage, a backward line for feeding back to the upstream stage reverse data received from the downstream stage or an operation result based on the reverse data received from the downstream stage, a decoder for executing a process corresponding to an externally supplied instruction to produce an execution result and for outputting data representative of the execution result to a selected one of the forward and backward lines, and a latch circuit for synchronizing data output from each of the lines with respect to other of the arithmetic-logic circuits; and
a controller operable to output an instruction array, the instruction array including the externally supplied instructions arranged in n rows and m columns, the controller serially outputting each of the m columns of instructions to a first arithmetic-logic circuit in a serial operation pipeline, and for each of the m columns output, the controller executing a process which includes allowing execution of an instruction in the column in the first arithmetic-logic circuit, deleting the executed instruction from the column, and outputting the column to a next downstream arithmetic-logic circuit, the controller repeating the process until all of the n rows of instructions are deleted.

8. The arithmetic device as claimed in claim 7, wherein an operation procedure for executing an operation through one path is determined in the instruction array.

9. An arithmetic device, comprising:
a switchable connector operable to switchingly connect data input/output lines of plural systems;
a plurality of serial operation pipelines connected in parallel with the switchable connector; and
an instruction receive mechanism operable to receive externally supplied instructions for the plurality of serial operation pipelines;
each of the plurality of serial operation pipelines including a plurality of arithmetic-logic circuits connected in a cascade fashion, each of the arithmetic-logic circuits being operable together with other of the arithmetic-logic circuits, and
each of the plurality of arithmetic-logic circuits including a forward line for outputting to a downstream stage data received from an upstream stage or an operation result based on the data received from the upstream stage, a backward line for feeding back to the upstream stage reverse data received from the downstream stage or an operation result based on the reverse data received from the downstream stage, a decoder for executing a process corresponding to an externally supplied instruction to produce an execution result and for outputting data representative of the execution result to a selected one of the forward and backward lines, and a latch circuit for synchronizing data output from each of the lines with respect to other of the arithmetic-logic circuits;
wherein the forward line includes a pair of lines for outputting first output data and second output data to the downstream stage, and the backward line includes a line for outputting the reverse data; and
the latch circuit in each of the plurality of arithmetic-logic circuits includes:
a first data latch circuit that latches the first output data;
a second data latch circuit that latches the second output data;
a reverse latch circuit that latches the reverse data;
a carry latch circuit that latches a carry resulting from an operation executed by the decoder for the operation of a succeeding figure;
a shift latch circuit that delays one of the first output data and the second output data for a given period of time; and
a control latch circuit that latches control data for controlling an operation of the data latched in the first and second data latch circuits and the reverse latch circuit.

10. The arithmetic device as claimed in claim 6, wherein the data on the forward line and the data on the backward line in the decoder of each of the plurality of arithmetic-logic circuits are data of a unit processing size.

11. The arithmetic device as claimed in claim 10, wherein the switchable connector, the plurality of serial operation pipelines and the instruction receive mechanism are installed in one semiconductor device.

12. An arithmetic-logic circuit which is connectable in a cascade fashion as a structural element of a serial operation pipeline, the arithmetic-logic circuit comprising:
at least one forward line for outputting to a downstream stage data received from an upstream stage of the serial operation pipeline or an operation result based on the data received from the upstream stage;
a backward line for feeding back to the upstream stage reverse data received from the downstream stage or an operation result based on the reverse data received from the downstream stage;
a decoder for executing a process corresponding to an externally supplied instruction to produce an execution result and for outputting data representative of the execution result to a selected one of the forward and backward lines; and
a latch circuit for synchronizing data output from each of the lines with respect to another arithmetic-logic circuit;
wherein the forward line includes a pair of lines for outputting first output data and second output data to the downstream stage, and the backward line includes a line for outputting the reverse data; and
the latch circuit includes:
a first data latch circuit that latches the first output data;
a second data latch circuit that latches the second output data;
a reverse latch circuit that latches the reverse data;
a carry latch circuit that latches a carry resulting from an operation executed by the decoder for the operation of a succeeding figure;
a shift latch circuit that delays one of the first output data and the second output data for a given period of time.

13. An arithmetic-logic circuit which is connectable in a cascade fashion as a structural element of a serial operation pipeline, the arithmetic-logic circuit comprising:
at least one forward line for outputting to a downstream stage data received from an upstream stage of the serial operation pipeline or an operation result based on the data received from the upstream stage;
a backward line for feeding back to the upstream stage reverse data received from the downstream stage or an operation result based on the reverse data received from the downstream stage;
a decoder for executing a process corresponding to an externally supplied instruction to produce an execution result and for outputting data representative of the execution result to a selected one of the forward and backward lines; and
a latch circuit for synchronizing data output from each of the lines with respect to another arithmetic-logic circuit;
wherein the forward line includes a pair of lines for outputting first output data and second output data to the downstream stage, and the backward line includes a line for outputting the reverse data; and
the latch circuit includes:
a first data latch circuit that latches the first output data;
a second data latch circuit that latches the second output data;
a reverse latch circuit that latches the reverse data;
a carry latch circuit that latches a carry resulting from an operation executed by the decoder for the operation of a succeeding figure;
a shift latch circuit that delays one of the first output data and the second output data for a given period of time; and
a control latch circuit that latches control data for controlling an operation of the data latched in the first and second data latch circuits and the reverse latch circuit.

14. An operation method using a serial operation pipeline, comprising:
providing a serial operation pipeline by connecting in a cascade fashion a plurality of arithmetic-logic circuits including at least one first line for outputting data from an upstream stage to a downstream stage, and a second line for feeding back reverse data from the downstream stage to the upstream stage, each of the plurality of arithmetic-logic circuits being capable of independently conducting serial operations and selecting one of the lines to which data representative of an operation result is output;

providing an instruction array which reflects a process of simultaneous execution through one path by the plurality of arithmetic-logic circuits, the instruction array including instructions for executing the process arranged in n rows and m columns;

serially outputting each of the m columns of instructions to a first arithmetic-logic circuit of the serial operation pipeline;

for each of the m columns output, executing an instruction in the column in the first arithmetic-logic circuit, deleting the executed instruction from the column, and outputting the column to a next downstream arithmetic-logic circuit; and repeating the process until all of the n rows of instructions are deleted.

15. The operation method as claimed in claim 14, wherein the data on each line of each of the plurality of arithmetic-logic circuits includes data of a unit processing size.

* * * * *